(12) United States Patent
Hastings

(10) Patent No.: US 12,033,027 B2
(45) Date of Patent: Jul. 9, 2024

(54) SHORT PATH QUANTUM PROCEDURES FOR SOLVING COMBINATORIAL OPTIMIZATION PROBLEMS

(71) Applicant: Microsoft Technology Licensing, LLC, Redmond, WA (US)

(72) Inventor: Matthew Hastings, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1431 days.

(21) Appl. No.: 16/286,337

(22) Filed: Feb. 26, 2019

(65) Prior Publication Data

US 2019/0266213 A1 Aug. 29, 2019

Related U.S. Application Data

(60) Provisional application No. 62/635,113, filed on Feb. 26, 2018.

(51) Int. Cl.
*G06N 10/00* (2022.01)
*G06F 17/11* (2006.01)
*G06F 17/17* (2006.01)

(52) U.S. Cl.
CPC ............. *G06N 10/00* (2019.01); *G06F 17/11* (2013.01); *G06F 17/17* (2013.01)

(58) Field of Classification Search
None
See application file for complete search history.

(56) References Cited

U.S. PATENT DOCUMENTS

2013/0282636 A1* 10/2013 Macready .............. B82Y 10/00
706/46

OTHER PUBLICATIONS

"The case against Quantum Computing" by Mikhail Dyakonov, IEEE Spectrum 2015 (Year: 2018).*
"Quantum Computing in the NISQ era and beyond" John Presikill, Quantum (Year: 2018).*
"Full stack ahead: Pioneering quantum hardware allows for controlling up to thousands of qubits at cryogenic temperatures" by Dr. Chetan Nayak, Microsoft Research Blog (Year: 2021).*
"Quantum Computing: Progress and Prospects" National Academies of Sciences, Engineering, and Medicine (2019) (Year: 2019).*
Will Quantum Computing Ever Live Up to Its Hype? John Horgan, Scientific American (Year: 2021).*
"NISQ computing: where are we and where do we go?" Lau et al. AAPS Bulletin (Year: 2022).*
"Error mitigation extends the computational reach of a noisy quantum processor" Kandala et al. Nature vol. 567 (Year: 2019).*

(Continued)

*Primary Examiner* — Bradley Smith
(74) *Attorney, Agent, or Firm* — Klarquist Sparkman, LLP

(57) ABSTRACT

Disclosed herein are example quantum algorithms to solve certain problems (e.g., exactly) in combinatorial optimization, including weighted MAX-2-SAT as well as problems where the objective function is a weighted sum of products of Ising variables, all terms of the same degree D; this problem is called weighted MAX-ED-LIN2. In some cases, it is desirable that the optimal solution be unique for odd D and doubly degenerate for even D; however, example algorithms still work without this condition and it is shown how to reduce to the case without this assumption at the cost of an additional overhead.

5 Claims, 9 Drawing Sheets

(56) References Cited

OTHER PUBLICATIONS

Brassard et al., "Quantum Amplitude Amplification and Estimation," *Mathematics*, vol. 305, pp. 1-32 (May 2000).
Brown et al., "Using Quantum Computers for Quantum Simulation," arXiv:1004.5528v3 (submitted to *Entropy*), pp. 1-43 (Nov. 2010).
Farhi et al., "A Quantum Adiabatic Evolution Algorithm Applied to Random Instances of an NP-Complete Problem," *Science*, vol. 292, pp. 1-15 (Apr. 2001).
Farhi et al., "Quantum Computation by Adiabatic Evolution," arXiv:quant-ph/000110, MIT CTP #2936, pp. 1-24 (Jan. 2000).
Grover, "A fast quantum mechanical algorithm for database search," *ACM Symp. on Theory of Computing*, pp. 212-219 (1996).
International Search Report and Written Opinion dated May 29, 2019, from International Patent Application No. PCT/US2019/019613, 17 pp.

\* cited by examiner

Cause a quantum computing device to evolve from a first Hamiltonian state toward a second Hamiltonian state, wherein the second Hamiltonian state provides a solution to a combinatorial optimization problem, and wherein the first Hamiltonian state is not the ground state of the first Hamiltonian - 610

700

Cause a quantum computing device to evolve from a first Hamiltonian state toward a second Hamiltonian state, wherein the second Hamiltonian state provides a solution to a combinatorial optimization problem, and wherein the first Hamiltonian state is not the ground state of the first Hamiltonian - 610 ated solution and outputting the approximate solution. In certain implementations, the quantum computing device applies amplitude amplification to the evolution to increase the success probability of the evolution.
SHORT PATH QUANTUM PROCEDURES FOR SOLVING COMBINATORIAL OPTIMIZATION PROBLEMS

CROSS-REFERENCE TO RELATED APPLICATIONS

This application claims the benefit of U.S. Provisional Application No. 62/635,113 entitled "SHORT PATH QUANTUM PROCEDURES FOR SOLVING COMBINATORIAL OPTIMIZATION PROBLEMS" and filed on Feb. 26, 2018, which is hereby incorporated by reference herein.

TECHNICAL FIELD

The disclosure pertains to quantum computing procedures.

BACKGROUND

While quantum algorithms are useful for many problems involving linear algebra, there are few proven speedups for combinatorial optimization problems. The most basic such speedup is Grover's algorithm which gives a quadratic speedup over a brute-force search. However, while Grover's algorithm is adaptable to various problems, approaches that provide further speedup for particular problems are needed.

SUMMARY

Disclosed herein are example quantum algorithm to solve certain problems (e.g., exactly) in combinatorial optimization, including weighted MAX-2-SAT as well as problems where the objective function is a weighted sum of products of Ising variables, all terms of the same degree D; this problem is called weighted MAX-ED-LIN2. In some cases, it is required that the optimal solution be unique for odd D and doubly degenerate for even D; however, the algorithm still works without this condition and it is shown how to reduce to the case without this assumption at the cost of an additional overhead.

While the time required is still exponential, examples of the disclosed algorithms provably outperform Grover's algorithm assuming a mild condition on the number of low energy states of the target Hamiltonian. A detailed analysis reveals a tradeoff between the number of such states and algorithm speed: fewer such states allows a greater speedup. This leads to a hybrid algorithm that can find either an exact or approximate solution.

In certain embodiments, a quantum computing device is caused to evolve from a first Hamiltonian state toward a second Hamiltonian state, wherein the second Hamiltonian state provides a solution to a combinatorial optimization problem, and wherein the first Hamiltonian state is not the ground state of the first Hamiltonian. In certain implementations, the causing the quantum computing device to evolve from the first Hamiltonian state to the second Hamiltonian state comprises applying a measurement procedure that adiabatically evolves qubits of the quantum computing device toward the second Hamiltonian state. The measurement procedure can comprise, for example, the measurement procedure of Algorithm 2. In particular implementations, the solution is an exact solution to the combinatorial optimization problem. In some implementations, the solution is an approximate solution to the combinatorial optimization problem, and the method further comprises performing a random sampling or Grover search during the evolution, thereby determining that a current state of the quantum computing device is the approximate solution and outputting the approximate solution. In certain implementations, the quantum computing device applies amplitude amplification to the evolution to increase the success probability of the evolution.

Other embodiments comprise a quantum computing device configured to evolve from a non-ground-state first Hamiltonian state to a second Hamiltonian state that describes a solution to a combinatorial optimization problem.

In further embodiments, a quantum computing device is caused to evolve from a first Hamiltonian state toward a second Hamiltonian state, wherein a term proportional to $H_Z$ is fixed during the evolution and a term that is proportional to a power of a transverse field is varied during the evolution. In some implementations, the second Hamiltonian state describes an exact solution to a combinatorial optimization problem. In certain implementations, the second Hamiltonian state describes an approximate solution to the combinatorial optimization problem, and the method further comprises: performing a random sampling or Grover search during the evolution, thereby determining that a current state of the quantum computing device is the approximate solution; and outputting the approximate solution. In further implementations, the quantum computing device applies amplitude amplification to the evolution to increase the success probability of the evolution. Another embodiment is a quantum computing device configured to evolve from a first Hamiltonian state toward a sceond Hamiltonian state, wherein a term proportional to $H_Z$ is fixed during the evolution and a term that is proportional to a power of a transverse field is varied during the evolution.

In some embodiments, a first phase estimation technique is performed on a set of one or more qubits in the quantum computing device. After the first phase estimation, the set of one or more qubits is evolved from a first state to a second state. After the evolving, a second phase estimation technique is performed on the set of one or more qubits in the quantum computing device. Results of the second phase estimation technique are evaluated relative to an error criteria. A solution to a combinatorial optimization problem provided by the set of one or more qubits in the second state is determined to be acceptable or not acceptable based on the evaluation of the results of the second phase estimation technique. In some implementations, the method further comprises, prior to the evolving, evaluating results of the first phase estimation technique relative to the error criteria; and resetting the one or more qubits if the one or more qubits do not satisfy the error criteria. In certain implementations, the first state is a first Hamiltonian state that is not a ground state. In some implementations, the second state is an exact solution to the combinatorial optimization problem. In further implementations, the second state is an approximate solution to the combinatorial optimization problem. In certain implementations, a phase estimation technique is performed on a set of one or more qubits in the quantum computing device. Results of the phase estimation technique are evaluated relative to an error criteria. If the results of the phase estimation technique satisfy the error criteria, a computational basis state is determined and output without evolving the set of one or more qubits. In some implementations, the determining and outputting the computational basis state without evolving the set of one or more qubits comprises: measuring a state of the one or more qubits in the computational basis to a generate a computational basis state; and computing a value of $H_Z$. In particular implementations, the computing the value of $H_Z$ is performed using a classical computer. In some implementations, the determining and outputting the computational basis state without evolving the set of one or more qubits further comprises: comparing the value of $H_Z$ to an expected energy value; and based on the comparison, determining that the computational basis state is an acceptable solution to a combinatorial optimization problem.

The foregoing and other objects, features, and advantages of the disclosed technology will become more apparent from the following detailed description, which proceeds with reference to the accompanying figures.

DETAILED DESCRIPTION

I. General Considerations

Figure 1:
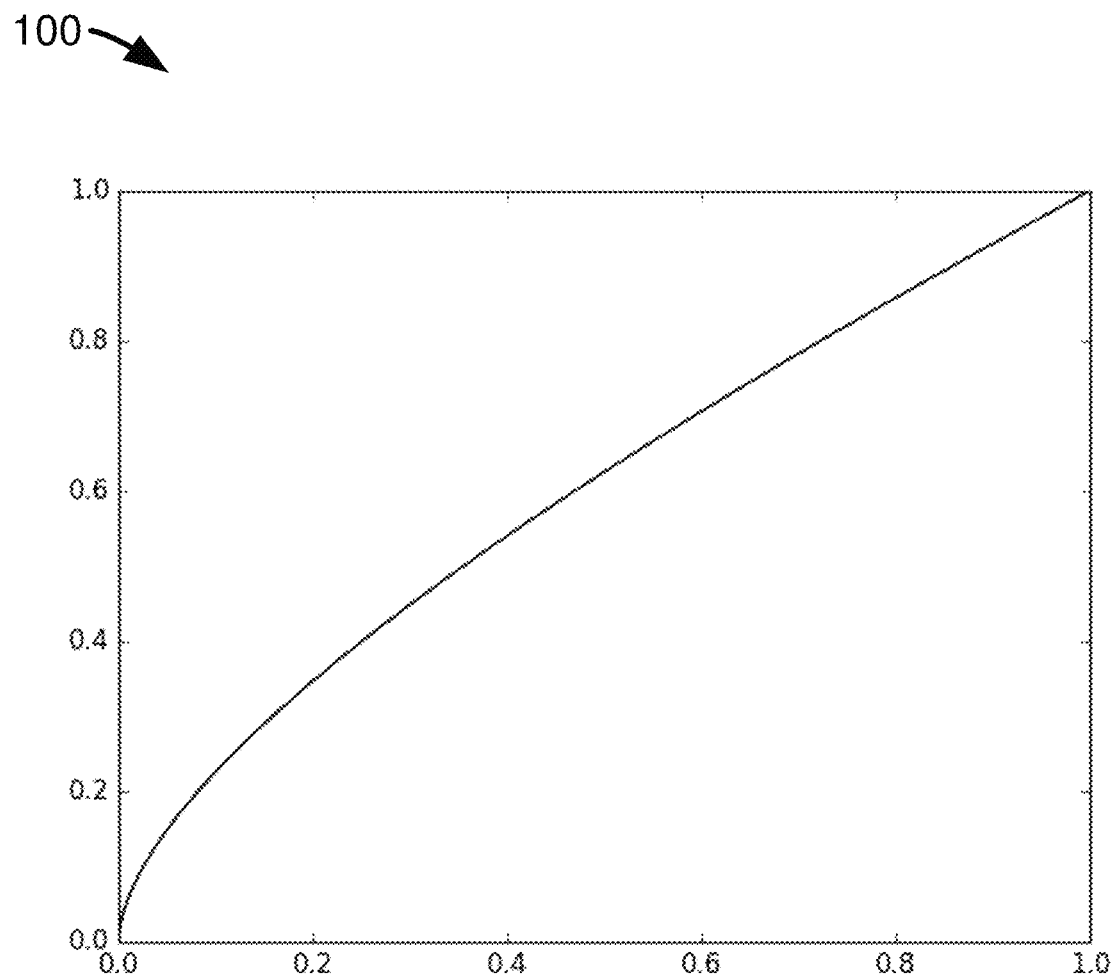
FIG. 1 is a graph 100 plotting $\tau(\cdot)$.

As used in this application, the singular forms "an," and "the" include the plural forms unless the context clearly dictates otherwise. Additionally, the term "includes" means "comprises." Further, the term "coupled" does not exclude the presence of intermediate elements between the coupled items. Further, as used herein, the term "and/or" means any one item or combination of any items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

II. Introduction

While quantum algorithms are useful for many problems involving linear algebra, there are few proven speedups for combinatorial optimization problems. The most basic such speedup is Grover's algorithm, which gives a quadratic speedup over a brute-force search. See L. K. Grover, in Proceedings of the twenty-eighth annual ACM symposium on Theory of computing, pp. 212-219 (ACM, 1996). For a problem such as finding the ground state of an Ising model on N spins, this can lead to a speedup from a brute force time $\mathcal{O}^*(2^N)$ (where $\mathcal{O}^*(\cdot)$ is big-O notation up to polylogarithmic factors, in this case polynomials in N) to $\mathcal{O}^*(2^{N/2})$. In the black box setting, Grover's algorithm is optimal, but for problems with a structure one might try to find a further speedup. See C. H. Bennett, K. Bernstein, G. Brassard, and U. Vazirani, SIAM journal on Computing 26, 1510 (1997).

One attempt to find a speedup in the adiabatic algorithm. E. Farhi, J. Goldstone, S. Gutmann, J. Lapan, A. Lundgren, and D. Preda, Science 292, 472 (2001).

Here let $$H_Z = \sum_{i,j} J_{i,j} Z_i Z_j, \qquad (1)$$

where i labels different qubits and $Z_i$ is Pauli Z matrix on the i-th qubit. Then, consider the Hamiltonian $$H_s = -(1-s)X + sH_Z, \qquad (2)$$

where $$X = \sum_i X_i \qquad (3)$$

and $X_i$ is the Pauli X matrix on the i-th qubit. At s=0, the ground state of this Hamiltonian can be easily prepared. At s=1, the ground state is the ground state of $H_Z$. If the spectral gap of $H_s$ between the ground and first excited state is only polynomially small for $s \in [0, 1]$, then one may adiabatically evolve the ground state from s=0 to s=1 in polynomial time.

Unfortunately, the gap may become superpolynomially small. Indeed, it was argued using ideas from Anderson localization (see B. Altshuler, H. Krovi, and J. Roland, Proceedings of the National Academy of Sciences 107, 12446 (2010)) that the gap may become as small as $N^{-const.\times N}$ so that the time required for adiabatic evolution is of order $N^{const.\times N}$ which is much slower than even classical brute force search. While the actual behavior for random instances may be more complicated than this, specific examples can show this behavior. See S. Knysh and V. Smelyanskiy, arXiv preprint arXiv:1005.3011 (2010); D. Wecker, M. B. Hastings, and M. Troyer, Physical Review A 94, 022309 (2016).

This is perhaps not surprising. The problem of finding the ground state of $H_Z$ is extremely hard, even if one restricts $J_{ij} \in \{-1, 0, 1\}$ for all i, j. While some speedups are known for bounded degree there, the graph is considered with spins as vertices and an edge between vertices if the corresponding element of J is nonzero, and degree refers to the degree of this graph), if one only allows polynomial space then the fastest classical algorithms for arbitrary J take a time $\mathcal{O}^*(2^N)$. See M. Furer and S. P. Kasiviswanathan, in International Conference on Current Trends in Theory and Practice of Computer Science, pp. 272-283 (Springer, 2007); A. D. Scott and G. B. Sorkin, Discrete Optimization 4, 260

(2007); A. Golovnev and K. Kutzkov, Theoretical Computer Science 526, 18 (2014); and M. B. Hastings, arXiv preprint arXiv:1610.07100 (2016).

If one allows exponential space then it is possible to reduce this time to $\mathcal{O}*(2^{\omega N/3})$, where ω is the matrix multiplication exponent. However, not only does that algorithm require exponential space, but it is not known how to give a Grover speedup of this algorithm, so that no quantum algorithm is known taking time $\mathcal{O}*(2^{cN/2})$ for any c<1. Finally, this algorithm is specific to constraint satisfaction problems where each constraint only involves a pair of variables, rather than a triple or more.

Here, example quantum algorithms to find the ground state of $H_Z$ are presented. Further, these algorithms improve on Grover's algorithm in many cases.

A. Problem Definition

An algorithm to find the ground state of $H_Z$ (eigenstate of $H_Z$ with minimum eigenvalue; eigenvalues of $H_Z$, $H_s$ will often be called "energies") assuming that the ground state energy $E_0$ is known is presented later. Here, the following conditions on $H_Z$ are imposed. Let N be the number of qubits. Here, let $H_Z$ be any Hamiltonian that is a weighted sum of products of Pauli Z operators, with each product containing exactly D such operators on distinct qubits for some given D. That is, the case D=2 is the Ising model, the case D=4 is a sum of terms $Z_i Z_j Z_k Z_l$ for i, j, k, l all distinct, and so on. In this example, take $D=\mathcal{O}(1)$. It should be emphasized that all products must have the same D so that one does not allow, for example, $H_Z = Z_1 Z_2 + Z_1 Z_2 Z_3$; this is for a reason explained later.

Each product has a weight that is an integer. $J_{tot}$ defined to be the sum of the absolute values of the weights. It is further required that $J_{tot} = \mathcal{O}(\text{poly}(N))$. Indeed, any β>0 is fixed and it is required that $J_{tot} = \mathcal{O}(N^\beta)$. (If all weights are chosen from {−1, +1} one has $J_{tot} = \mathcal{O}(N^2)$.)

It is further required that $H_Z$ has a unique ground state for D odd while for D even it is required that $H_Z$ has a doubly degenerate ground state. For even D, the operator $\Pi_i X_i$ commutes with the Hamiltonian, flipping all spins, so that every eigenvalue has an even degeneracy. This assumption is termed the "degeneracy assumption".

Two theorems 1, 2 are presented herein, which describe the performance of the algorithm; the different theorems correspond to different choices of the parameters in the algorithm. Both theorem show, roughly, that at least one of two things hold: the algorithm finds the ground state in a certain expected time or $H_Z$ has a large number of low energy states (eigenstates with eigenvalue close to $E_0$).

These theorems can be applied in one of several ways. One way is to define a promise problem, in which it is promised that $H_Z$ does not have such a large number of low energy states as well as promised the degeneracy assumption on $H_0$. Then, the algorithm solves this promise problem. For this promise problem, while the algorithm is given $E_0$, it is not necessary to know $E_0$ in advance since one can try all possible $E_0$ with only polynomial overhead.

Alternatively, one can consider $H_Z$ without such a promise on the number of low energy states but still including the promise on the degeneracy assumption. Then, a hybrid algorithm can be given that tries both running the quantum algorithm here to find the exact ground state as well as random sampling (or a Grover search) to find an approximate ground state. This hybrid algorithm will be explained after theorem 1.

The problem of minimizing $H_Z$ is also known as MAX-ED-LIN2, as it is assumed that each term is exactly of degree D, rather than having degree at most D; of course, there is an overall sign difference also, as one tries to minimize $H_Z$ rather than maximizing. Due to the uniqueness condition on $H_Z$, this problem is referred to herein as UNIQUE-MAX-ED-LIN2. However, one can reduce MAX-2-LIN2 to MAX-E2-LIN2, where MAX-2-LIN2 allows terms to have degree 1 or 2. Up to a sign difference, this means that one can consider $H_Z = \Sigma_{i,j} J_{i,j} Z_i Z_j + h_i Z_i$, with integer $J_{i,j}, h_i$ and $\Sigma_{ij}|J_{ij}| + \Sigma_i |h_i| = J_{tot}$, with $H_Z$ required to have a unique ground state. One can find the ground state of this problem by finding one of the two ground states of a problem on N+1 spins defined by $H_Z = \Sigma_{i,j} J_{i,j} Z_i Z_j + \Sigma_i Z_0 Z_i$, where 0 is the added spin.

B. Main Results

This section discusses the main results from embodiments of the disclosed techniques. The parameters b, K enter into the definition of the algorithm, given later. In each theorem, the statement about the number of low energy states of $H_Z$ is first expressed as a statement about probability distributions with high entropy and low energy which then implies the statement about the number of low energy states. For this discussion, let N(E) denote the number of computational basis states with expectation value E for $H_Z$.

Two distinct theorems are presented, corresponding to two cases, whether K=C log(N) for C>0 a fixed constant or whether K is a fixed constant independent of N. Fixed K leads to a larger speedup but requires a stronger promise.

In this disclosure, when K=C log(N) is written, it is meant that K is taken to be the smallest odd integer larger than C log(N). Further, the dependence on these constants in the equations is explicitly written and not hidden in big-O notation. The quantity b is also a fixed constant independent of N. Additionally, it is assumed that b<1 else the second possibility (item 2 in the list) is trivially true and does not imply any interesting constraint on the density of states.

Theorem 1. Assume that $H_Z$ obeys the degeneracy assumption. Suppose that $B = -bE_0$ and K=C log(N). Then, at least one of the following holds:

1. The algorithm finds the ground state in expected time.

$$\mathcal{O}^*\left(2^{N/2} \exp\left[-\frac{b}{2CD} \frac{N}{\log(N)} \cdot \left(1 - \frac{1}{|E_0|}\right)\right]\right)$$

2. There is some probability distribution p(u) on computational basis states with entropy at least $$S^{(comp)} \geq N \cdot (1 - \mathcal{O}(1)/C)$$

and with expected value of $H_Z$ at most $$(1-b)E_0 + \mathcal{O}(1) \cdot \frac{J_{tot}}{N^2} C^2 D^2 \ln(N)^2.$$

Further, for any η>0, for some $$E \leq E_0 + (1+\eta)\left(b|E_0| + \mathcal{O}(1) \cdot \frac{J_{tot}}{N^2} C^2 D^2 \ln(N)^2\right), \text{ one has}$$

$$\log(N(E)) \geq N \cdot \left(1 - \mathcal{O}(1) \frac{1+\eta}{\eta} \frac{1}{C}\right).$$

Theorem 1 implies the following corollary about a hybrid algorithm:

Corollary 1. There, is an algorithm that, given $H_Z$ and $E_0$, either outputs "approximate" or "exact". If it outputs "approximate", it returns also a state with enemy at most $$E_{approx} \equiv E_0 + (1.01)\left(b|E_0| + O(1) \cdot \frac{J_{tot}}{N^2}C^2D^2\ln(N)^2\right)$$

and takes time at most $\mathcal{O}^*(2^{\mathcal{O}(1)N/C})$. If it outputs "exact", it outputs an exact ground state of $H_Z$. The expected run time of the algorithm (averaged over both approximate and exact outputs, rather than conditioned on an output) is $$\mathcal{O}^*\left(2^{N/2}\exp\left[-\frac{b}{2CD}\frac{N}{\log(N)}\cdot\left(1-\frac{1}{|E_0|}\right)\right]\right).$$

Proof. Take $\eta=0.01$.

Run the following algorithm. First, try repeated random sampling of states to find a state with energy at most $E_{approx}$. Take a total of $\eta_{samp}$ samples. If any sample succeeds, terminate the algorithm, returning "approximate" and the given state. If item 2 of the theorem holds, each sample succeeds in finding such a state with probability at least $2^{-\mathcal{O}(1)N/C}$, so one can choose $\eta_{samp}=2^{\mathcal{O}(1)N/C}$ ($\mathcal{O}^*$) such samples and succeed with probability at least $1-2^{-N}$.

If no sample succeeds, then run the quantum algorithm of this paper in parallel with a brute force search, until one of them finds an exact ground state, returning "exact" and the state found.

The run time bound on the approximate output holds by construction. The expected run time bounds are now shown. If item 1 holds, then the algorithm of this disclosure succeeds in expected time $$\mathcal{O}^*\left(2^{N/2}\exp\left[-\frac{b}{2CD}\frac{N}{\log(N)}\cdot\left(1-\frac{1}{|E_0|}\right)\right]\right)$$

so the expected run time bound holds. If item 2 holds and the repeated random sampling fails to find on approximate state then the brute force search will find the ground state in time $\mathcal{O}^*(2^N)$; since the probability that the repeated random sampling fails is $\leq 2^{-N}$, this adds a negligible amount to the expected time of the algorithm.

Remark: the repeated random sampling can be quadratically improved with Grover search but this only improves constants which are hidden in the big-O notation.

The case of constant K is now given. The function $\tau(\cdot)$ in theorem 2 is a continuous increasing function, taking [0, 1] to [0, 1]. It is defined in lemma 11. It is differentiable on this interval, except at zero; for small $\sigma$.

$$\tau(\sigma) = \Theta\left(\sqrt{\frac{\sigma}{-\ln(\sigma)}}\right). \quad (4)$$

FIG. 1 is a graph 100 plotting $\tau(\cdot)$.

Theorem 2. Assume, that $H_Z$ obeys the degeneracy assumption. Suppose that $B=-bE_0$ with $0\leq b<1$. Suppose that $K\geq 3$ and $K>\beta$, with K independent of N. Then, at least one of the following holds:

1. The algorithm finds the ground state in expected time $$\mathcal{O}^*\left(2^{N/2}\exp\left[-\frac{b}{2DK}N\cdot\left(1-\frac{1}{|E_0|}\right)\right]\right).$$

2. For some $x_0 \geq x_{min}=N\cdot(\frac{1}{2}N^2)^{1/K}$, there is some probability distribution p(u) on computational basis states with entropy at least $$S^{(comp)}\geq N\tau^{-1}((x_0-x_{min}/K)/N)$$

and with expected value of $H_Z$ at most $$E_0 + O(1)\frac{J_{tot}K^2D^2}{X_{min}^2} + B\left(\frac{x_0+x_{min}/K}{N}\right)^K \cdot O(1).$$

Further, defining $$F(S) \equiv E_0 + O(1)\frac{J_{tot}K^2D^2}{X_{min}^2} + B(\tau(S/N))^K \cdot O(1), \quad (5)$$

Then for some $E>E_0$ one has $\log(N(E))\geq F^{-1}(E)$.

There are two parameters b, K that can be adjusted in this algorithm, so the implications of this theorem take some unpacking. Next, an argument can be made that for most problems for many choices of b, K the conditions of items 2. of the theorem will not be satisfied and hence a nontrivial speedup will occur from item 1. The next paragraph will deliberately be more heuristic, and will draw on some physics intuition, since the goal is not to prove a result but rather to argue that certain conditions do not occur in most examples.

Consider, for instance, a simple example, $K=99$, $b=\frac{1}{99}$. Then, either the algorithm gives a speedup over a Grover search, taking expected time $\mathcal{O}^**(2^{cN/2})$ for a c slightly less than 1, or there are a large number of computational basis states with low energy for $H_Z$. Let $S(E)=\log(N(E))$. Now consider whether one can satisfy $S(E)\geq F^{-1}(E)$ for any $E>E_0$. For E near 0, one has S(E) close to N slice a typical state has energy E near 0. If one had taken $b=1$, one could then satisfy $N\geq F^{-1}(0)$. However, the function F(S) is bounded at $$E_0 + O(1)\frac{J_{tot}K^2D^2}{X_{min}^2} + BO(1),$$

and the constant hidden in the big-O notation $\mathcal{O}(1)$ is such that for $b=\frac{1}{99}$ one has F(S) bounded away from zero. Indeed, F(S) will be roughly bounded by $(1-b\mathcal{O}(1))E_0$. For clarity in explanation, pretend that the constant hidden in the $\mathcal{O}(1)$ is equal to 1. Then, one could have a problem if $S(\frac{98}{99}E_0)\approx N$. However, this means an enormous (entropy almost equal to N) number of states have energy which is $\frac{98}{99}$ times the ground state energy. Now let one instead ask whether the conditions of item 2. can be satisfied for $x_0$ close to 0. Indeed, for example such as the Sherrington-Kirkpatrick spin glass, the entropy S(E) has a power law dependence on $E-E_0$, with the scaling behavior well-understood from the Parisi solution, giving $S(E)\sim N^*(E-E_0)^{2/3}$. By choosing K large, from studying the limiting behavior of c one finds that the condition might be satisfied at small $E-E_0$ if $S(E)\sim(E-$ $E_0)^{2/99}$ up to some polylogs in energy. So, again, one would not expect to obey item 2. at small $x_0$ since $1/99 < 2/3$.

On the other hand, a model such as the "toy model" of D. Wecker, M. B. Hastings, and M. Troyer, Physical Review A94, 022309 (2016) has a unique ground state but has $S(E) \approx N/2$ for $E = E_0 + 1$. Thus, for this model, one cannot consider fixed k without satisfying item 2. of the theorem but one can still obtain a nontrivial speedup by taking $K = C \log(N)$, albeit not giving $\tilde{O}^*(2^{cN/2})$ with $c < 1$.

C. Outline

In accordance with an example embodiment of the disclosed technology, the algorithm has at least three distinct inventive contributions. First, a short path evolution is used, where the initial state is not a ground state of the initial Hamiltonian. Rather than trying to follow the full evolution from a transverse field Hamiltonian that is diagonal in the X basis to $H_Z$ which is diagonal in the Z basis, one can instead follow only a "short path", keeping a term proportional to $H_Z$ in the Hamiltonian fixed and varying a transverse field-like term from a small value to zero. This term is called "transverse field-like" rather than a transverse field, because a more complicated term $-B(X/N)^K$ is added that is proportional to a power of the transverse field. This is the second inventive contribution and plays a role in avoiding small spectral gaps. The third inventive contribution uses measurements to obtain adiabatic evolution with exponentially small error; similar ideas are in R. Somma, S. Boixo, H. Barnum, and E. Knill, Physical review letters 101, 130504 (2008).

It will now be shown that either the algorithm succeeds in giving a nontrivial speedup or a certain spectral gap becomes small. However, for such a gap to become small, there must be some state with a large expectation value for $-B(X/N)^K$ and with a small expectation value for $H_Z$. Roughly, the underlying principle is that for a large K, this imposes strong constrains on the expectation value of X. For example, if the state is an eigenstate of X, then one would have $\langle X/N \rangle = \langle (X/N)^K \rangle^{1/K}$, and so for large K, even a small expectation value of $(X/N)^K$ would give a large expectation value for X/N. Technically, the implementation is more complicated than this because there may be large fluctuations in X in the state. Ignoring these technical details for the moment, the next contribution is that given a large expectation value of X, one can use log-Sobolev estimates on entropy to relate the expectation value of X to the entropy in the computational basis. This is then used to show that there must be many eigenstates of $H_Z$ with low energy.

Other technical tools used include a Brillouin-Wigner perturbation theory to compute overlaps and a method of localizing wavefunctions in X.

In sections III, IV an example algorithm is given. In section V, the Brillouin-Wigner perturbation theory is explained. Two cases are then considered, depending on the the spectrum of the Hamiltonian $QH_sQ$, where Q projects onto the states of $H_Z$ with energy$> E_0$. Theorem 3 in section VI assumes the first case and gives bounds on the spectral gap of $H_s$ and shows the speedup of the algorithm. Theorem 4 in section VII assumes the second case and shows the existence of probability distributions over computational basis states with high entropy and low energy. Putting these results together, theorems 1, 2 follow as shown in section VIII; there, the high entropy and low energy probability distributions are used to identify lower bound N(E). In section IX, some other results are discussed as well as some remarks presented on a hybrid algorithm.

Section VII will use the ground state degeneracy assumption for convenience, but it is shown how to remove this assumption for the results of this section. Section VI will rely more heavily on the ground state degeneracy assumption.

III. An Example Short Path Algorithm

An example short algorithm is based on applying amplitude amplification to another algorithm. See G. Brassard, P. Hoyer, M. Mosca, and A. Tapp, Contemporary Mathematics 306, 53 (2002). This latter algorithm is Algorithm 1. Remark: The case K=1, B=cN corresponds to a transverse magnetic field of strength c. Also, note the direction of evolution from s=1 to s=0.

To analyze this algorithm for even D, the following definition is desirable.

Definition 1. For D even, define the "even subspace" to be the eigenspace of $\Pi_i X_i$ with eigenvalue +1 and define the "odd subspace" to be the eigenspace of $\Pi_i X_i$ with eigenvalue −1.

The Hamiltonian $H_s$ commutes with $\Pi_i X_i$ and $\psi_+$ is in the even subspace; the measurement algorithm will be chosen to preserve the eigenvalue of $\Pi_i X_i$. When one analyses the algorithm for even D, all references for the remainder of the paper to the Hamiltonian will refer to the Hamiltonian projected into the even subspace and all vectors will be in the even subspace.

At s=0, $H_s$ has a unique ground state; call this state $|0\rangle$; for even D this state $|0\rangle$ is the unique ground state of $H_Z$ in the even subspace and it is an equal amplitude superposition of two computational

---

Algorithm 1 Short-Path (unamplified version)

1. Prepare the wavefunction in the state $\psi_+ = |+\rangle^{\otimes N}$.
2. Use the measurement algorithm of section IV to evolve under the Hamiltonian $H_s$ from s = 1 to s = 0.
   where
   $$H_s = H_z - sB(X|N)^K, \qquad (6)$$
   where
   $$X = \sum_i X_i. \qquad (7)$$
   where K is a positive integer (chosen odd for convenience later) and B is a scalar chosen later. When Hamiltonian $H_s$ is referred to, it will be assumed that $s \in [0, 1]$. B > 0 is selected so that $H_s$ has all off-diagonal entries non-positive in the computational basis
3. Measure the state in the computational basis and compute the value of $H_z$ after measuring. If this value is equal to $E_0$ then declare success and output the computational basis state.

--- basis states. Let $\psi_{0,s}$ be the ground state of $H_s$; by Perron-Frobenius this state is unique for s≥0. When the uniqueness of a state is referred to, the uniqueness up to an overall phase is meant. All state, vectors that are written will be assumed to be normalized to have unit norm, except where explicitly staled otherwise later.

The squared overlap can be computed as follows:
$$P_{ov} \equiv |\langle \psi_+ | \psi_{0,1} \rangle|^2. \qquad (8)$$

later.

Suppose that the gap remains $\Omega(1/\text{poly}(N))$ along the path. Indeed, conditions under which the gap is $\Omega(1)$ will be given. Then, for any $P_{succ} < 1$, $\epsilon > 0$ one can use the measurement algorithm explained in section IV to produce, with probability at least $P_{ov}P_{succ}$, a state equal to $\psi_{0,0}$ up to some error $\epsilon$. This algorithm takes a time that is $\mathcal{O}(\text{poly}(N, (1-P_{succ})^{-1}), \log(1/\epsilon))$. This measurement algorithm has the advantage, compared to adiabatic evolution, that one can achieve a better scaling with the error $\epsilon$.

Thus, the quantum algorithm described above succeeds with probability at least $P_{ov}P_{succ}-\epsilon$ in finding the ground state of $H_Z$. One can take $\epsilon=2^{-N}$ so that the error $\epsilon$ is negligible compared to $P_{ov}$ computed later. In this example, $P_{succ}=\frac{1}{2}$ is chosen. Hence, applying the method of amplitude amplification to the evolution, one obtains an algorithm which succeeds in producing the ground state of $H_Z$ in expected time $\mathcal{O}(P_{ov}^{-1/2}P_{succ}^{-1/2}\text{poly}(N,\log(1/\epsilon)))$.

IV. Measurement Algorithm for Adiabatic Evolution with Smaller Error

In this section, an explanation is provided for how to do step 2. of algorithm 1. The method is first explained in general setting, and then it is shown that in a particular case here it can be reduced to a single measurement.

Suppose that one has a path of Hamiltonians for $H_s$, for $s \in [0,1]$. Suppose further that all of these Hamiltonians have a unique ground state $\psi_{0,s}$, separated from the rest of the spectrum by a gap at least $\Delta=\Omega(1/\text{poly}(N))$ and suppose that $\|\partial_s H_s\|=\mathcal{O}(\text{poly}(N))$. Suppose that for any s, one can simulate time evolution under $H_s$ for time t up to error $\delta$ in a time that is $\mathcal{O}(\text{poly}(N,t,\log(1/\delta)))$. This holds for the Hamiltonians $H_s$ considered above so long as $B=\mathcal{O}(\text{poly}(N))$ using any of several different algorithms in the literature which achieve this time. See G. H. Low and I. L. Chuang, Phys. Rev. Lett. 118, 010501 (2017), 1606.02685v2; G. H. Low and I. L. Chuang (2016), 1610.06546; D. W. Berry. A. M. Childs. R. Cleve, H. Kothari, and R. D. Somma (2014), pp. 283-292, 1312.1414; D. W. Berry, A. M. Childs, R. Cleve, R. Kothari, and R. D. Somma, Phys. Rev. Lett. 114, 090502 (2015), 1412.4687: and D. W. Berry, A. M. Childs, and R. Kothari, in 2015 IEEE 56th Annual Symposium on Foundations of Computer Science (2015), pp. 792809, ISSN 0272-5428, 1501.01715.

We seek a quantum algorithm that, taking a state $\psi$ as input with overlap $P_{ov}=|\langle\psi|\psi_{0,1}\rangle|^2$ will succeed, with probability at least $P_{ov}P_{succ}$ for $P_{succ}$ close to 1, in giving an output state which is equal to $\psi_{0,0}$ up to some error $\epsilon$, with $\epsilon$ exponentially small. A few different ways to do this are considered, before describing measurement evolution.

A natural way to do this is to follow adiabatic evolution of the Hamiltonians (to simulate a time-dependent Hamiltonian which slowly changes from $H_1$ to $H_0$, taking $\psi$ as input to the evolution and $\tilde{\psi}$ as output). Unfortunately, this method has two problems, one minor and one major. The minor problem is that one must then simulate time-dependent evolution of a Hamiltonian; this problem is not too serious as for example the Taylor series approach can simulate this evolution in a time that is $\mathcal{O}(\text{poly}(N,t,\log(1/\delta)))$ even for slowly varying Hamiltonians. The major problem is that there may be diabatic transitions from the ground state $\psi_{0,s}$ to some excited state along the path. While there is some controversy about the exact error estimates in the adiabatic theorem, even the best estimates give an error that is super-polynomially small but not exponentially small in the evolution time. A. Ambainis and O. Regev, arXiv preprint quant-ph/0411152 (2004); and B. W. Reichardt, in Proceedings of the thirty-sixth annual ACM symposium on Theory of computing (ACM, 2004), pp. 502-510. Hence, even taking these estimates, in order to obtain an error $\delta$ that is exponentially small in N, it is desirable to have a super-polynomial evolution time.

It is possible that a careful analysis of the error terms in the adiabatic algorithm would show that the required evolution time is not in fact too large. The speedup of the short path algorithm over a Grover search is complicated and a detailed analysis may show that the super-polynomial time for adiabatic evolution is negligible compared to this speedup. However, given some question about even simpler error estimates in the adiabatic theorem, it is preferable not to use this method.

However, it is possible to use the following algorithm 2.

| Algorithm 2 Measurement Algorithm |
|---|
| 1. Let $\psi$ be the input state. |
| 2. Phase estimate $\psi$ using $H_1$. If the energy estimate is larger than $E_{0,1} + \Delta/2$, then terminate the algorithm and return failure. Else continue. |
| 3. Adiabatically evolve $\psi$ from $H_1$ to $H_0$. |
| 4. Phase estimate $\psi$ using $H_1$. If the energy estimate is larger than $E_{0,1} + \Delta/2$, then terminate the algorithm and return failure. Else declare success and return $\psi$. |

One can also replace the adiabatic evolution of step 3. with a sequence of measurements as in D. Poulin, A. Kitaev, D. S. Steiger, M. B. Hastings, and M. Troyer (2017), 1711.11025.

In algorithm 2, the initial phase estimation is used to approximately project onto $\psi_{0,1}$. Then the estimation is adiabatically evolved. Finally, the technique is repeated with another phase estimation to project onto $\psi_{0,0}$. Now consider the error in the phase estimation. Consider, for example, the scheme of A. Y. Kitaev, A. Shen, and M. N. Vyalyi, Classical and quantum computation, vol. 47 (American Mathematical Society Providence, 2002), though others are possible. There are two ways to quantify the error. One is the probability of error and the other is the precision. It suffices to have a precision that is sufficiently small compared to $\Delta$. One can take the probability of error in any step to be ($\epsilon$) so that the total probability of error is $\mathcal{O}(\epsilon)$. If controlled time evolution can be implemented exactly, the phase estimation has an overhead that is only logarithmic in the error. Using any of the time evolution algorithms above or using the disclosure of D. Poulin, A. Kitaev, D. S. Steiger, M. B. Hastings, and M. Troyer, arXiv preprint:arXiv:1711.11025 (2017), one can implement the controlled time evolution with error $\mathcal{O}(\epsilon)$ for a time $t \sim \Delta^{-1}$ with a cost that is $\mathcal{O}(\text{poly}(\Delta^{-1},N,\log(1/\epsilon)))$.

The adiabatic evolution can be selected so that for input state $\psi=\psi_{0,1}$, the output state has squared overlap with $\psi_{0,0}$ equal to $1-P_{diab}$ for some $P_{diab}$ close to 0. From the adiabatic theorems quoted above, the adiabatic evolution time required is only polynomial in $P_{diab}^{-1}$. Hence, Lemma 1. For any $\psi$, and $P_{diab}>0,\epsilon>0$ The algorithm succeeds with probability at least $|\psi_{0,1}|\psi|^2(1-P_{diab})-\mathcal{O}(\epsilon)$. It takes a time $\mathcal{O}(\text{poly}(N, \log(1/\epsilon), P_{diab}^{-1}))$. Assuming success, the output state has squared overlap at least $1-\epsilon$ with $\psi_{0,0}$.

In fact, for the Hamiltonian $H_s$ from section III, it will later be shown that (under a spectral gap assumption and under some assumptions on B, K that is given later that)

$$|\langle\psi_{0,1}|\psi_{0,0}\rangle|^2=\Omega(1). \quad (9)$$

Hence, for this problem, one can use a single measurement, just phase estimating $H_{0,1}$, and not use any adiabatic evolution. There is no need for the final phase estimation on $H_0$ since this measurement in the computational basis projects into an eigenstate of $H_Z$ whose energy can then be computed classically.

This leads to the following simple algorithm Algorithm 3 which replaces Algorithm 1.

---
Algorithm 3 Simplified Short-Path (unamplified version)
---
1. Let $\psi = \psi_+$ be the input state.
2. Phase estimate $\psi$ using Hamiltonian $H_1$. If the energy estimate is greater than $E_{0,s} + \Delta/2$, then terminate the algorithm and return failure.
3. Measure the state in the computational basis and compute the value of $H_Z$ after measuring. If this value is equal to $E_0$ then declare success and output the computational basis state.
---

As a technical remark, the above algorithm assumes that one knows $E_{0,s}$. However, in the application that is considered herein, one has good estimates on $E_{0,s}$, given later. Further, even without these estimates, one could modify the algorithm as follows: for j=n, skip step b. For j<n, replace step b by declaring failure if the estimate of energy for $H_{s_j}$ is greater than or equal to the previous energy estimate of $H_{s_{j+1}}$ plus $\Delta/2 + \mathcal{O}(1/\mathrm{poly}(N))$. That is, the procedure fails if the energy jumps from step to step. Then, assuming success, the final state has a squared overlap with $\psi_{0,0}$ that is at least $|\langle \psi_{0,1}|\psi\rangle|^2 - \mathcal{O}(\epsilon)$.

As a further remark, for even D many of the Hamiltonian simulation algorithms that are referred to can be chosen to preserve the even subspace exactly. Even if they do not preserve it exactly, they preserve it up to some error $\epsilon$ which is chosen to be negligible. Hence, if desired, one can do the simulation using $H_s$ not projected into the even subspace.

V. Brillouin-Wigner Perturbation Theory

The Brillouin-Wigner perturbation theory can be used to compute the ground state of $H_s$ as a function of s. In the case that $H_0$ has a unique ground state (as is considered here), the Brillouin-Wigner perturbation theory gives a particularly simple result for the excited states, given in Eq. (13). There are many references for Brillouin-Wigner perturbation theory; a useful reference is J. Leinaas and T. Kuo. Annals of Physics 111, 19 (1978), which also gives some convergence results. Certain useful derived results are presented below.

For even D, the even subspace is considered throughout this section.

A. Introduction

This subsection begins with some general results based on Brillouin-Wigner perturbation theory. The results in this subsection do not use any properties of the specific choice of $H_s$ above, except that it is assumed that $H_0$ has a unique ground state (one feature of this perturbation theory, however, is that it becomes only slightly more complicated when the ground state is degenerate, while Rayleigh-Schrodinger perturbation theory becomes much more degenerate). A Hamiltonian $H_s = H_0 + sV$ is considered in this subsection with $H_0$, V arbitrary, later taking $V = -B(X/N)^K$.

Let $|0\rangle$ be the ground state of $H_0$. Let $Q = 1 - |0\rangle\langle 0|$. Let $\phi_{0,s}$ be the ground state of $H_s$. To define the Brillouin-Wigner perturbation theory, it is convenient to normalize the states differently, rather than normalizing them to have unit norm. One can use the normalization that $$\langle \phi_{0,s}|0\rangle = 1. \tag{10}$$

so that $$\psi_{0,s} = \frac{\phi_{0,s}}{|\phi_{0,s}|}. \tag{11}$$

Let $E_{0,s}$ denote the energy of $\psi_{0,s}$. Let $$G_0(\omega) = (Q(\omega - H_0)Q)^{-1}, \tag{12}$$

where $\omega$ is a scalar and where the inverse is computed in the subspace which is the range of Q and let $(1-Q)G_0 = G_0(1-Q) = 0$. That is, $G_0(\omega)$ is a Moore-Penrose pseudo-inverse of $Q(H-\omega)Q$, so that $G_0(\omega)(\omega - H_0) = (\omega - H_0)G_0(\omega) = Q$.

Then one has $$\phi_{0,s} = |0\rangle + \sum_{k \geq 1} (sG_0(E_{0,s})V)^k |0\rangle. \tag{13}$$

Note that by definition $G_0 V = G_0 Q V$.

Note that $E_{0,s}$ appears in the power series of $\phi_{0,s}$. Thus, in applications of this perturbation theory to compute eigenvectors or eigenvalues, it is necessity to self-consistently compute $E_{0,s}$, using $$E_{0,s} = E_0(0) + \sum_{k \geq 0} \langle 0 | V(sG_0(E_{0,s})V)^k \rangle \tag{14}$$

Bounds for $E_{0,s}$ are given later.

The correctness of Eq. (13) as a formal power series in s can be readily verified by computing $(H - E_{0,s})\phi_{0,s}$. In subsequent subsections, conditions for convergence of this power series will be given and computations for $|\phi_{0,s}|$ will be presented. Eq. (10) is immediate from Eq. (13).

B. Overlap

Now consider the specific choices of $H_0 = H_Z$ and $V = -B(X/N)^K$ using Eq. (6) One can compute the overlap $\langle \psi_+|\phi_{0,1}\rangle$, assuming convergence of the series (13) and assuming a bound on $E_0 - E_{0,1}$. Note that $E_{0,1} < E_0$.

For odd D, let one use $|u\rangle, |v\rangle, \ldots$ to denote basis state in the computational basis. For even D, let one use $|u\rangle$ to denote the equal amplitude superposition of a pair of basis states in the computational basis, with the two basis states related by flipping all the spins. Each u labels a bit string of length N; let $\bar{u}$ denote the bit string with all bits flipped. Then, $|u\rangle$ and $|\bar{u}\rangle$ denote the same basis state for new D.

Let $E_u, E_v, \ldots$ denote the corresponding eigenvalues for these states for Hamiltonian $H_0$. Then, $$\langle \psi_+ | \phi_{0,1}\rangle = \langle \psi_+ | 0\rangle + B\sum_{u \neq 0}\langle \psi_+ | u\rangle \frac{\langle u|(X/N)^K|0\rangle}{E_u - E_{0,1}} + \tag{15}$$

$$B^2 \sum_{u \neq 0}\sum_{v \neq 0} \langle \psi_+ | u\rangle \frac{\langle u|(X/N)^K|v\rangle}{E_u - E_{0,1}} \frac{\langle v|(X/N)^K|0\rangle}{E_V - E_{0,1}} + \ldots$$

For any u, one has $\langle \psi_+|u\rangle = 2^{-N/2}$.

Before continuing, consider two technical lemmas. First, the following lemma which estimates $\langle 0|(X/N)^L|0\rangle$.

Lemma 2. For $0<L<N$ even, $\langle 0|(X/N)^L|0\rangle \leq L!!/N^L \leq (L/N)^{L/2}$ where $(L-1)!!=(L-1)\cdot(L-3)\ldots$.

For L odd, $\langle 0|(X/N)^L|0\rangle = 0$.

For L, L' both even with $0<L<L'$ one has $\langle 0|(X/N)^{L'}|0\rangle > \langle 0|(X/N)^L|0\rangle$, hence for $L>N/2$ one has $\langle 0|(X/N)^L|0\rangle \leq 2^{-N/4}$.

Proof. One has $\langle 0|(X/N)^L|0\rangle = N^{-L} \Sigma_{i_1} \ldots X_{i_L}|0\rangle$.

First consider odd D. The expectation value vanishes unless for all j, there are an even number of a such that $i_a=j$. In that case, the expectation value is equal to 1. Thus, there must be some $a>1$ such that $i_a=i_1$. There are N possible choice of $i_1$ and L-1 possible choices of $a>1$. Hence, $\langle 0|(X/N)^L|0\rangle \leq ((L-1)/N)((X/N)^{L-2})$. So, $\langle 0|(X/N)^L|0\rangle \leq L!!/N^L \leq (L/N)^{L/2}$, where $L!!=(L-1)(L-3)\ldots$.

For even D, for $L \geq N$, there are additional terms in the expectation where for all j, there are an odd number of a such that $i_a=j$. However, since one has chosen $L \leq N$, such terms do not occur.

The monotonic decrease with increasing L is immediate when working in the X basis since $(X/N)^L > (X/N)^{L'}$.

Second, the following inequality is also used.

Lemma 3. Let $x_1, \ldots, x_k$ be positive random variables. The variables need not be independent of each other. Then $\mathbb{E}[\Pi_{i=1}^k x_i^{-1}] \geq \Pi_{i=1}^k (\mathbb{E}[x_i])^{-1}$.

Proof. We have $\mathbb{E}[\Pi_{i=1}^k x_i^{-1}] = \mathbb{E}[\exp(-\Sigma_{i=1}^k \ln(x_i)] \geq \exp(-\mathbb{E}[\Sigma_{i=1}^k \ln(x_i)])$, where the inequality is by convexity of the log. However, $-\mathbb{E}[\ln(x_i)] \geq -\ln(\mathbb{E}[x_i])$, again by convexity. So, $\mathbb{E}[\Pi_{i=1}^k x_i^{-1}] \geq \exp(-\Sigma_{i=1}^i \ln(\mathbb{E}[x_i]))=\Pi_{i=1}^k(\mathbb{E}[x_i])^{-1}$.

It is now shown that

Lemma 4. Assume that $E_{0,1} \geq E_0 - 1$ and assume that series (15) is convergent. let $B=\mathcal{O}(\text{poly}(N))$. Then, $$\langle \psi_+ | \phi_{0,1}\rangle \geq 2^{-N/2} \exp\left[\frac{BN}{(2DK+\mathcal{O}(1/N^3)(1-E_0)}\right] \quad (16)$$

Proof. Note that all terms in Eq. (15) are non-negative, one can re-express the series in terms of a random walk on the basis states $|u\rangle$ as follows. The random walk starts in state $|0\rangle$ at time 0. If the random walk is in some state $|u_t\rangle$ at time t, then the state of the random walk at time t+1 is given by repeating K times the process of picking a random spin and flipping that spin. Note that one can flip the same spin more than once in a single step of the random walk (indeed, it may be flipped up to K times) although this is unlikely for $k << \sqrt{N}$. That is, each step of the random walk considered here is K steps of a random walk on the Boolean hypercube.

For $t>0$, it will be said that the random walk "returns at time t" if the state of the random walk at time t is $|0\rangle$. For $t>0$, it will be said that the random walk "returns by time t" if the random walk returns at some time s with $0<s \leq t$. Let $P_{nr}(t)$ denote the probability that the random walk does not return by time t. Let $\mathbb{E}_{nr,t}$ denote an expectation value conditioned on the random walk not returning by time t. Then, one has $$\langle \psi_+ | \phi_{0,1}\rangle = 2^{-N/2} \sum_{t=0}^{\infty} B^t \mathbb{E}_{nr,t}\left[\prod_{m=1}^{t} \frac{1}{E_{u_m} - E_{0,1}}\right] P_{nr,t}. \quad (17)$$

where the random walk as a sequence of states $u_1, \ldots, u_t$.

One can estimate $P_{nr,t}$ from lemma 2. One has $$P_{nr,t} \leq \sum_{0<s \leq t} \langle 0|(X/N)^{Ks}|0\rangle,$$

where $\langle 0|(X/N)^{Ks}|0\rangle$ is the probability that it returns at time s. By lemma 2, for $t=\mathcal{O}(\text{poly}(N))$ and $K \leq 3$, one has $P_{nr,t}=\mathcal{O}(1/N^3)$.

Eq. (17) requires computing the expectation value of $$\prod_{m=1}^{t} \frac{1}{E_{u_m} - E_{0,1}}.$$

Applying lemma 3 to this expectation value, one has $$\mathbb{E}_{nr,t}\left[\prod_{m=1}^{t} \frac{1}{E_{u_m} - E_{0,1}}\right] \geq \prod_{m=1}^{t} \frac{1}{\mathbb{E}_{nr,t}[E_{u_m} - E_{0,1}]}. \quad (18)$$

Suppose the state of the random walk at time t is given and has some energy $E_{u_t}$. Then, if one picks a single spin at random and flip it, the expectation value of the energy of the resulting state is equal to $$\left(1 - 2\frac{D}{N}\right)E_{u_t}.$$

to see this, consider any term in $H_0$ which is a product of D spins; the probability that one of these spins is flipped, changing the sign of this term, is D/N. Remark: this is the point at which the assertion that all terms in $H_Z$ have the same degree D can be used; otherwise, the dependence of the average energy on m would be much more complicated.

Repeating mK times, one finds that the expectation value of the energy at time m+1, for given $u_m$, is equal to $$\mathbb{E}[E_{u_m}] = \left(1 - 2\frac{D}{N}\right)^{mK} E_0 \leq \left(1 - 2\frac{Dm}{K}\right)E_0. \quad (19)$$

Since $E_{u_m} \geq E_0$ for all $u_m$, one has for $t=\mathcal{O}(\text{poly}(N))$, $$\mathbb{E}[E_{u_m}] \geq (1-P_{nr,t})E_0 + P_{nr,t}\mathbb{E}_{nr,t}[E_{u_m}]. \quad (20)$$

So, for $t=\mathcal{O}(\text{poly}(N))$ where $P_{nr,t}=\mathcal{O}(1/N^3)$ one has $$\mathbb{E}_{nr,t}[E_{u_m}] \leq \left(1 - 2\frac{DmK}{N} - \mathcal{O}(1/N^3)\right)E_0. \quad (21)$$

So, by Eqs. (18, 21) one has $$\mathbb{E}_{nr,t}\left[\prod_{m=1}^{t} \frac{1}{E_{u_m} - E_{0,1}}\right] \geq \quad (22)$$

$$\frac{1}{1+\left(\frac{2DK}{N}+\mathcal{O}(1/N^3)\right)|E_0|} \cdot \frac{1}{1+\left(\frac{4DK}{N}+\mathcal{O}(1/N^3)\right)|E_0|}$$

$$\cdots \frac{1}{1+\left(\frac{2tDK}{N}+\mathcal{O}(1/N^3)\right)|E_0|} \geq$$

$$\frac{1}{\left(\frac{2DK}{N}+\mathcal{O}(1/N^3)\right)(1-E_0)} \cdot \frac{1}{\left(\frac{4DK}{N}+\mathcal{O}(1/N^3)\right)(1-E_0)}$$

$$\cdots \frac{1}{\left(\frac{2tDK}{N}+\mathcal{O}(1/N^3)\right)(1-E_0)}$$

So, the sum in Eq. (15) obeys $$\langle \psi_+ | \phi_{0,1} \rangle \geq 2^{-N/2} \sum_{t=0}^{\mathcal{O}(poly(N))} B^t P_{nr,t} \left( \frac{N}{(2DK+\mathcal{O}(1/N^3))(1-E_0)} \right)^t \frac{1}{t!} = \quad (23)$$

$$2^{-N/2} \left( \exp\left[ \frac{BN}{(2DK+\mathcal{O}(1/N^3))(1-E_0)} \right] - o(1) \right).$$

Here, the fact that the power series expansion of $\exp(\alpha) = \rho_{t \geq 0} \alpha^t/t!$ and $\rho_{t \geq s} \alpha^t/t!$ is negligible for $s \gg \alpha$ is used. Indeed, $\Sigma_{t \geq s} \alpha^t/t!$ is exponentially small in $\alpha$ for fixed ratio $s/\alpha$ with $s/\alpha > e$. Hence, one can choose the polynomial in the limits one the first line of Eq. (23) to be large compared to $$\frac{BN}{(2DK+\mathcal{O}(1/N^3))(1-E_0)}$$

and the remaining terms in the sum are $o(1)$.

VI. Convergence Properties, Energy Shift, and Norm

In this subsection, convergence of the series (15), bounding the shift on energy $E_0-E_{0,1}$ and bounding the norm $|\phi_{0,1}|$, and considering the gap of $H_s$ are considered. Most of the results will be based on considering the spectrum of $QH_sQ$.

The following three results are first shown. Eq. (27) below implies that Eq. (9) holds.

Lemma 5. 1. The series (15) always converges, assuming that the value of $E_{0,1}$ in the series indeed is equal to the ground state energy of $H_1$.

2. Consider the Hamiltonian $QH_sQ$. Let $E_{0,s}^Q$ be the smallest eigenvalue of this Hamiltonian in the subspace spanned by the range of Q. Then, $\partial_s E_{0,s}^Q \leq 0$.

Finally, assume that $E_{0,1}^Q \geq E_0 + \frac{1}{2}$. Then, $$E_{0,1} \geq E_0 - B\langle 0|(X/N)^K|0\rangle - 2B^1 \langle 0|(X/N)^{2K}|0\rangle. \quad (24)$$

and $$|\phi_{0,1}|^2 \leq 1 + 4B^2 |Q(X/N)^K|0\rangle|^2 \leq 1 + 4B^2 \langle 0|(X/N)^{2K}|0\rangle. \quad (25)$$

For K odd with $\langle 0|B^2(2K/N)^{2K}|0\rangle \leq \frac{1}{2}$, one has that $$E_{0,1} \geq E_0 - 1, \quad (26)$$

and $$|\phi_{0,1}| \leq 2. \quad (27)$$

Proof. Defining $$G_s(\omega) = (Q(\omega - H_s)Q)^{-1}, \quad (28)$$

the power series (13) is a series expansion of $$\phi_{0,s} = |0\rangle + sG_s(E_{0,s})V|0\rangle \quad (29)$$

in powers of s. Thus, the series 13 is convergent if $G_t(E_{0,s})$ does not have any poles for $|t| \leq |s|$.

The above convergence statement holds for arbitrary $H_0$, V. Now consider $H_0 = H_Z$, $V = -B(X/N)^K$. Since all off-diagonal terms of $QH_sQ$ are negative, and since by the Perron-Frobenius theorem, this matrix has a smallest eigenvector which has all coefficients positive (in fact, in almost all examples, this eigenvector is unique but one does not need this; an example where it may not be unique is with K=N). Hence, $\partial_s E_{0,s}^Q \leq 0$. Hence, the series for s=1 is convergent if $E_{0,1}^Q > E_{0,1}$.

With this definition of $G_s$, one has $$E_{0,s} = E_0 + s\langle 0|V|0\rangle - s^2\langle 0|VG_s(E_{0,s})V|0\rangle. \quad (30)$$

Let $H_0 = H_Z$, $V = -B(X/N)^K$. Assume that $E_{0,1}^Q \geq E_0 + \frac{1}{2}$. Since $E_{0,1} \leq E_0$, $G_1(E_{0,1})$ has operator norm bounded by 2. So, $$E_{0,1} \geq E_0 - B \approx 0|(X/N)^K|0\rangle - 2B^2 \approx 0|(X/N)^{2K}|0\rangle. \quad (31)$$

Also, if $G_1(E_{0,1})$ has operator norm bounded by 2, one has $$|\phi_{0,1}|^2 \leq 1 + 4B^2 |Q|X/N)^K|0\rangle|^2 \leq 1 + 4B^2 \langle 0|(X/N)^{2K}|0\rangle. \quad (32)$$

This proves Eqs. (24, 25). Eqs. (26, 27) are immediate.

Now, the gap of $H_s$ is considered:

Lemma 6. The Hamiltonian $H_s$ has a gap between ground and first excited states that is greater than or equal to $E_{0,s}^Q - E_0$. Since $\partial_s E_{0,s}^Q \leq 0$, the gap of $H_s$ is greater than or equal to $E_{0,1}^Q - E_0$.

Proof. This is a special case of a general result. Consider a Hamiltonian $$H = E_0|0\rangle\langle 0| + \sum_{a \neq 0} E_a |a\rangle\langle a| + \sum_{a \neq 0} v_a(|a\rangle\langle 0| + h.c.), \quad (33)$$

where $v_a$ is an arbitrary vector. It will be shown that for any $E_a$, $v_a$, $E_0$, the spectral gap of this Hamiltonian is greater than or equal to $\min_{a \neq 0}(E_a - E_0)$. Then, to apply this result to the spectral gap of $H_1$, take the states $|a\rangle$ in Eq. (33) to be eigenstates of $QH_1Q$.

Define the Green's function $G(\omega) = (\omega - H)^{-1}$. One has $$\langle 0|G|0\rangle = (\omega - E_0 - \rho(\omega))^{-1}, \quad (34)$$

where $$\sum(\omega) = \sum_{a \neq 0} |v_a|^2 (\omega - E_a)^{-1}. \quad (35)$$

For $\omega < \min_{a \neq 0}(E_1 - E_0)$, one has $\Sigma(\omega) < 0$. Hence, $\langle 0|G|0\rangle$ does not have any poles in the interval $E_0 < \omega < \min_{1 \neq 0}(E_1 - E_0)$. Hence, if H has an eigenvalue in this interval, then the corresponding eigenvector has vanishing amplitude on $|0\rangle$; however, any such eigenvector has eigenvalue equal to $E_a$ for some a, so no such eigenvector exists.

Thus, all eigenvalues of $H_1$ for any v are contained in $(-\infty, E_0] \cup [\min_a(E_a), \infty)$. If $v_a = 0$ for all a, there is exactly one eigenvalue in the interval $(-\infty, E_0]$ and so this cannot change as $v_a$ changes.

Hence it follows that:

Theorem 3. Consider the Hamiltonian $QH_sQ$. Let $E_{0,s}^Q$ be the smallest eigenvalue of this Hamiltonian in the subspace spanned by the range of Q. Assume that $E_{0,1}^Q \geq E_0 + \frac{1}{2}$ and assume that $\langle 0|B^2(2K/N)^{2K}|0\rangle \leq \frac{1}{2}$. Then 1. The Hamiltonian $H_s$ has gap at least ½ between the ground and first excited state.
2. One has $$\langle \psi_+ | \phi_{0,1} \rangle \geq \frac{1}{2} 2^{-N/2} \exp\left[\frac{BN}{(2DK + \mathcal{O}(1/N^3))(1-E_0)}\right]. \tag{36}$$

Remark: for $B=-bE_0$, $J_{tot}=\mathcal{O}(N^\beta)$, $K \geq \beta$, the condition $\langle 0|B^2(2K/N)^{2K}|0\rangle \leq \frac{1}{2}$ hold for all sufficiently large N.

VII. Gap Assumption And Entropy

In this section, it is assumed that $E_{0,1}{}^Q < E_0 + \frac{1}{2}$ and prove some consequences of that. In subsection VII A, it is shown how to construct states with large expectation value for X. In subsection VII B, entropic consequences of this using a log-Sobolev inequality are shown. In subsection VII C, these results are put together.

For technical convenience later, it is easier to work with an eigenvector of $H_1$. So it can be shown:

Lemma 7. Assume $E_{0,1}{}^Q < E_0 + \frac{1}{2}$. Then, there is an eigenvector $\Psi$ of $H_1$ with eigenvalue at most $E_0 + \frac{1}{2}$ such that $\langle \Psi | B(X/N)^K | \Psi \rangle \geq \frac{1}{4}$.

Proof. $H_1$ has at least two eigenvalues with energy at most $E_0 + \frac{1}{2}$. This is because the ground state of $QH_1Q$ in the subspace spanned by Q and the state $|0\rangle$ span a two dimensional space. Further, the average of energy over the corresponding eigenvectors is at most $E_0 + \frac{1}{4}$ since the ground state energy of $H_1$ is $\leq E_0$. On the other hand, the average of $h_Z$ over these eigenvectors is at least $E_0 + \frac{1}{2}$. Hence, the average of $B(X/N)^K$ over is at least $\frac{1}{4}$. So, at least one such $\Psi$ exists.

Remark: the above lemma is the only place in this section in which the degeneracy of $H_Z$ is used. The degeneracy was used to show that the average of $H_Z$ over these eigenvectors is at $E_0 + \frac{1}{2}$. However, it is not hard to remove the degeneracy assumption here, at the cost of slightly worse constants.

A. Localizing in X

In this section, it shown how given an eigenvector with a large expectation value for $B(X/N)^K$ one can construct a wavefunction with a large expectation value for X and whose expectation value for $H_Z$ is only slightly changed. This will be necessary to apply log-Sobolev bounds in the next section.

One can begin with a lemma that considers states of a Hamiltonian describing a single particle hopping in one-dimension:

Lemma 8. Let h be a real Hermitian tridiagonal matrix. Label rows and columns of h by an integer x, so that $h_{x,y}=0$ if $|x-y|>1$. Let $\psi$ be a real eigenvector of h with eigenvalue E. Let $\psi(x)$ denote the x-th entry of $\psi$. Let $h_{od}$ denote the off-diagonal part of h, i.e, $h_{od}$ has the same entries as h off the main diagonal and is zero on the main diagonal. Then, 1. For any integer $l>0$, for any y, there is a state $\xi$ with $|\xi|=1$ such that $$\langle \xi|h|\xi\rangle \leq E + \mathcal{O}(1/l^2)\|h_{od}\|, \tag{37}$$

and such that either $\xi(x)$ is non-vanishing only for $x<y+l$ or $\xi(x)$ is non-vanishing for $x>y-l$.

2. for small $\epsilon>0$, the state $\psi_\epsilon$ defined by $\psi_\epsilon(x)=\exp(\epsilon x)\psi(x)$ obeys $$\frac{\langle \psi_\epsilon|h|\psi_\epsilon\rangle}{|\psi_\epsilon|^2} \leq E + \mathcal{O}(\epsilon^2)\|h_{od}\|. \tag{38}$$

3. If the state $\psi_\epsilon$ defined above has $$\sum_{x \geq z} \psi_\epsilon(x)^2 \geq \frac{1}{2} \sum_x \psi_\epsilon(x)^2 \tag{39}$$

for some z, then there is a state $\xi$ with $|\xi|=1$ such that $$\langle \xi|h|\xi\rangle \leq E + \mathcal{O}(1/l^2 + \epsilon^2)\|h_{od}\| \tag{40}$$

and such that either $\xi(x)$ is non-vanishing only for $y-l<x<y+l$ for some $y \geq z$.

Proof. Assume without loss of generality that $E=0$ (otherwise add a scalar to h so that $E=0$). Assume without loss of generality that $\psi(x)$ is real. Let $f(x)$ be any function. Let $\hat{f}$ be the diagonal matrix with entries given by $f(\cdot)$. One can compute $$\langle \hat{f}|h|\hat{f}\rangle = \sum_x \left(f(x)^2 h_{x,x}\psi(x)^2 + \right. \tag{41}$$
$$f(x)f(x+1)h_{x,x+1}\psi(x)\psi(x+1) + f(x)f(x-1)h_{x,x-1}\psi(x)\psi(x-)) =$$
$$\sum_x f(x)^2 \psi(x)(h_{x,x}\psi(x) + h_{x,x-1}\psi(x-1) + h_{x,x+1}\psi(x+1)) +$$
$$\sum_x [f(x)(f(x+1) - f(x))h_{x,x+1}\psi(x)\psi(x+1) +$$
$$f(x)(f(x-1) - f(x))h_{x,x-1}\psi(x)\psi(x-1)] =$$
$$\sum_x [f(x)(f(x+1) - f(x))h_{x,x+1}\psi(x)\psi(x+1) +$$
$$f(x)(f(x-1) - f(x))h_{x,x-1}\psi(x)\psi(x-1)] =$$
$$\sum_x [f(x)(f(x+1) - f(x))h_{x,x+1}\psi(x)\psi(x+1) + f(x+1)(f(x) - f(x+1))$$
$$h_{x+1,x}\psi(x+1)\psi(x)] = -\sum_x (f(x) - f(x+1))^2 h_{x,x+1}\psi(x)\psi(x+1),$$

where the third equality follows from the fact that $h_{x,x}\psi(x)+h_{x,x-1}\psi(x-1)+h_{x,x+1}\psi(x+1)=0$ since $\psi$ is an eigenvector with eigenvalue 0 and the fourth equality follows by shifting the variable in the summation by 1.

To prove the first claim, let $\rho^< = \sum_{y-l<x\leq y} \psi(x)^2$ and let $\rho^> = \sum_{y\leq x<y+l} \psi(x)^2$. Assume $\rho^< > \rho^>$. Choosing $f(x)=1$ for $x\leq y$ and $f(x)=1-(x-y)$ for $y<x<y+l$ and $f(x)=0$ for $x\geq y+l$, one finds that $\langle \hat{f}\psi|h|\hat{f}\psi\rangle \leq \|h_{od}\|\rho^>$ and $|\hat{f}|^2 \geq l\rho^<$, so that for $\xi=\hat{f}/|\hat{f}|$, Eq. (37) is satisfied and $\xi(x)$ is nonvanishing only for $x<y+l$. If instead $\rho^< \leq \rho^>$, choose instead $f(x)=1$ for $x\geq y$ and $f(x)=1-|x-y|$ for $y-l<x<y$ and $f(x)=0$ for $x\leq y-l$ and for $\xi=\hat{f}/|\hat{f}|$, Eq. (37) is satisfied and $\xi(x)$ is nonvanishing only for $x>y-l$.

To prove the second claim, choose $f(x)=\exp(\epsilon x)$, so that one has $\langle \hat{f}\psi|h|\hat{f}\psi|h|\hat{f}\psi\rangle = -\Sigma_x\psi(x)\psi(x+1)h_{x,x+a}\mathcal{O}(\epsilon^2)\exp(2\epsilon x) \leq \mathcal{O}(\epsilon^2)\|h_{od}\|\cdot|\hat{f}\psi|^2$.

To prove the third claim, define $\rho_y = \Sigma_{|x-y|\leq l}\exp(2\epsilon x)\psi(x)^2$. If the assumption (39) holds, then there must be some $y>z$ such that $\rho_y \geq (\frac{1}{2})\rho_{z-2l}$; to see this, suppose no such y exists, then $\rho_{z+l} < (\frac{1}{2})\rho(z-l)$ and $\rho(z+3l) < (\frac{1}{4})\rho(z+2l)$ and so on so $\Sigma_{x\geq z}\psi_\epsilon(x)^2 < \rho_{x<z}\psi_\epsilon(x)^2$.

So, there must be some y>z such that $\rho_y \geq (1/2)\rho_{y-2l}$ and $\rho_y \geq (1/2)\rho_{y+2l}$. Choose $f(x)=\exp(\epsilon x)l$ for $|y-x| \leq l$, choose $f(x)= \exp(\epsilon x)(2l-|y-x|)$ for $l \leq |y-x| \leq 2l$ and choose $f(x)=0$ otherwise.

The above lemma applies to a one-dimensional Hamiltonian. However, one can apply it to an eigenvector $\Psi$ of the Hamiltonian $H_1$ as follows. Let $P_x$ project onto the eigenspace of X with eigenvalues in the interval $|xD-D/2, xD+D/1)$. Then, the Hamiltonian $H_1$, projected into the space spanned by $P_x\Psi/|P_x\Psi|$ obeys the conditions of lemma 8 with $\|h_{od}\| \leq \|H_Z\|$ and with $\psi(x) = \sqrt{(P_x\Psi\Psi)}$.

It is now shown how to attain a wavefunction with a large expectation value for X. This is done in two slightly different ways depending on how large k is. The lemma will involve an adjustable constant C>0; the constants hidden inside the big-O notation do not depend upon C.

Lemma 9. Assume that $E_{0.1}{}^Q < E_0 + 1/2$.

1. Assume that $K=C \ln(N)$. Let $B=-bE_0$ with $b \leq 1$. Then, there is a state $\Xi$, with $|\Xi|=1$ such that $$\langle \Xi|H/N|\Xi \rangle \geq 1 - \mathcal{O}(1)/C \tag{42}$$

and such that $$\langle \Xi|H_Z|\Xi \rangle \leq E_0 + 1/2 + O(1) \cdot \frac{J_{tot}}{N^2} C^2 D^2 \ln(N)^2 + B. \tag{43}$$

2. Assume that K is u constant, independent of N. Let $B=-bE_0$ with $b \leq 1$. Let $X_{min} = N \cdot (1/2 N^2)^{1/K}$. (Remark: Since $E_0 \leq N^2$, for $X < X_{min}$ we have $B(X/N)^K \leq 1/2$.)

Then, there is a state $\Xi$ with $|\Xi|=1$ such that $\Xi$ is supported on an eigenspace of X with eigenvalues in some interval $[x_0 - X_{min}/K, x_0 + X_{min}/K]$ for $x_0 \geq X_{min}$ and such that $$\langle \Xi|H_Z - B(X/N)^K|\Xi \rangle \leq E_0 + 1/2 + O(1)\frac{J_{tot}K^2D^2}{X_{min}^2}, \tag{44}$$

so that $$\langle \Xi|H_Z|\Xi \rangle \leq E_0 + 1/2 + O(1)\frac{N^2K^2D^2}{X_{min}^2} + B((x_0 + X_{min}/K)/N)^K \leq \tag{45}$$

$$E_0 + 1/2 + O(1)\frac{N^2K^2D^2}{X_{min}^2} + eB((x_0/N)^K)$$

Proof. The proof of both cases is the same. By lemma 7, there is an eigenstate $\Psi$ of $H_1$ with $\langle \Psi|H_1|\Psi\rangle \leq E_0 + 1/2$ and $\langle \Psi|B(X/N)^K|\Psi\rangle \geq 1/2$. Throughout, the state $\psi$ will be an eigenvector of h constructed from $\Psi$ as explained above by projecting into the space spanned by $P_x\Psi/|P_x\Psi|$.

Let $X_{min} = N \cdot (1/2 N^2)^{1/K}$. Since $E_0 \leq N^2$, for $X < X_{min}$ we have $B(X/N)^K \leq 1/2$. Recall that K is chosen odd. So $$\exp(k(X-X_{min})/X_{min}) \geq B(X/N)^K. \tag{46}$$

Hence, since $\langle \Psi|B(X/N)^K|\Psi\rangle \geq 1/2$, the state $\psi_\epsilon$ has $|\psi_\epsilon|^2 \geq 1/2$, for $\epsilon = KD/X_{min}$. (Remark: the factor of D in the definition of $\epsilon$ appears because of the scaling of X by D to define x when applying lemma 8)

For $X < X_{min} - K^{-1} \ln(2)$, one has $\exp(K(X-X_{min})/X_{min}) < 1/4$ so $\Sigma_{x \leq X_{min}/D - \epsilon^{-1}\mathcal{O}(1)}\psi_\epsilon(x)^2 \leq 1/4$. So, Eq. (39) is obeyed for $z \geq X_{min}/D - \epsilon^{-1}\mathcal{O}(1)$. Then, Eq. (44) follows by item 3 of lemma 8 choosing $l = \mathcal{O}*1)/\epsilon$, using $\|h_{od}\| \leq J_{tot}$. Eq. (43) follows because in this case $X_{min} = N \cdot (1 - \mathcal{O}(1)/C)$.

B. Log-Sobolev Inequality

Given a quantum state $\psi$, let $S^{(comp)}(\psi)$ be the entropy of the probability distribution of measurement outcomes when measuring the state in the computational basis. That is, if $\psi = \Sigma_u \psi(u)|u\rangle$, with $\Sigma_u |\psi(u)|^2 = 1$, then $$S^{(comp)}(\psi) = -\sum_u |\psi(u)|^2 \log_2(|\psi(u)|^2). \tag{47}$$

Here, entropy is measured using bits, (e.g., taking logs to base 2, rather than nats). This will lead to some various ln(2) differences between the definitions disclosed herein and definitions in the log-Sobolev literature.

In this subsection, the entropy $S^{(comp)}(\psi)$ is related to $\langle \psi|X|\psi\rangle$. It is clear that if $\langle \psi|X|\psi\rangle = N$, then $\psi = \psi_+$ up to an overall phase, and so $S^{(comp)}(\psi) = N$. Roughly, it will be shown that if $\langle \psi|X|\psi\rangle$ is extensive (e.g., equal to N times some nonzero constant), then $S^{(comp)}(\psi)$ is also extensive.

One such result uses the log-Sobolev inequality. This lemma 10 is not tight: it only gives a nontrivial bound on $\psi(\psi)$ if $\langle \Psi|X|\psi\rangle > (1-\ln(2))N$. In lemma 11, a tight bound and a precise statement of that rough extensivity claim above are given.

Lemma 10. Let $\psi(u)$ be real. Then, $$S^{(comp)}(\psi) \geq \left(1 - \frac{1}{\ln(2)}\right)N + \frac{1}{\ln(2)}\langle \psi|X|\psi\rangle. \tag{48}$$

Proof. This follows from the log-Sobolev inequality[??]. Define for any function $f(u)$, $$Ent(f) = \mathbb{E}\left[f \log_2\left(\frac{f}{\mathbb{E}[f]}\right)\right], \tag{49}$$

where the expectation is taken for a random choice of u in the domain of $f$. We have $\mathbb{E}[\psi^2] = 2^{-N}\Sigma_u \psi(u)^2 = 2^{-N}$. Here, $\psi$ is used to represent both a quantum state and a function $\psi(u)$. So, $$Ent(\psi^2) = 2^{-N}\sum_u \psi(u)^2(N + \log_2(\psi(u)^2)). \tag{50}$$

$$= 2^{-N}(N - S^{(comp)}(\psi))$$

The log-Sobolev inequality states that $$Ent(\psi^2) \leq 2^{-N}\frac{N - \langle \psi|X|\psi\rangle}{\ln(2)}. \tag{51}$$

Hence Eq. (48) follows.

A tighter bound on $S^{(comp)}$ follows from the log-Sobolev inequality of A. Samorodnitsky, arXiv preprint arXiv: 0807.1679 (2008). One has Lemma 11. Let $S(x) = -x \log_2(x) - (1-x)\log_2(1-x)$ be the binary entropy function (we use S rather than H to avoid confusion with the Hamiltonian H). Let $$\tau(\sigma) = 2\sqrt{S^{-1}(\sigma)(1-S^{-1}(\sigma))}. \tag{52}$$

(The inverse of S may be chosen arbitrarily so long as the same inverse is chosen in both locations.) Then, $$\tau\left(\frac{S^{(comp)}(\psi)}{N}\right) \geq \frac{\langle\psi|X|\psi\rangle}{N}. \quad (53)$$

The function $\tau(\cdot)$ is a continuous increasing function, taking [0.1] to [0,1]. For small $\sigma$, $$\tau(\sigma) = \Theta\left(\sqrt{\frac{\sigma}{-\ln(\sigma)}}\right), \quad (54)$$

and for small $\langle\psi|X|\psi\rangle/N$, $$\frac{S^{(comp)}(\psi)}{N} = \Theta\left((X/N)^2 \log(N/X)\right). \quad (55)$$

Proof. This follows from theorem 1.2 of A. Samorodnitsky, arXiv preprint arXiv:0807.1679 (2008). That theorem is expressed in terms of Ent($\psi^2$), up in multiplicative factors of ln(2) since natural logs are used in that paper. Use Eq. (50) to re-express this in terms of $S^{(comp)}(\psi)$ and then Eq. (53) follows after some algebraic manipulations.

The function $\tau(\cdot)$ has a simple interpretation. Consider a single qubit. The state $$\sqrt{H^-(\tau)}|0\rangle + \sqrt{1-H^{-1}(\tau)}|1\rangle$$

has entropy $\tau$ and has expectation value of X equal to $2\sqrt{H^{-1}(\tau)(1-H^{-1}(\tau))}$. The result is that this state minimizes entropy for the given expectation value of X.

Remark: in fact, while only the case of pure states has been considered herein, it is possible to show a generalization of Eq. (53) to mixed states. One does not need this generalization here, but it is interesting to note that it exists. Let $\rho$ be a density matrix. Let $S^{(comp)}(\rho)$ be the entropy of the mixed state obtained by measuring $\rho$ in the computational basis. Then, one has $$\tau\left(\frac{S^{(comp)}(\rho)}{N}\right) \geq \frac{tr(X\rho)}{N}. \quad (56)$$

This can be proven similarly to the proof of the pure state case: one establishes it for a single qubit, and then one uses convexity of c and conditional entropy to show it for an arbitrary number of qubits.

C. Number of Low Energy Eigenstates

Theorem 4. Assume that $E_{0.1}{}^Q < E_0 + \frac{1}{2}$.

1. Assume that $K = C \ln(N)$. Let $B = -bE_0$ with $b \leq 1$. Let $C = \Theta(1)$. Then, there is some probability distribution $p(u)$ on computational basis states with entropy at least $$S^{(comp)} \geq N \cdot (1 - \mathcal{O}(1)/C)$$

and with expected value of $H_Z$ at most $$(1-b)E_0 + O(1) \cdot \frac{J_{tot}}{N^2} C^2 D^2 \ln(N)^2.$$

2. Assume that K is a constant, independent N. Let $B = -bE_0$ with $b \leq 1$. Then, for some $x_0 \geq x_{min} = N \cdot (\frac{1}{2}N^2)^{1/K}$, there is some probability distribution $p(u)$ on computational basis states with entropy at least $$S^{(comp)} \geq N\tau^{-1}((x_0 - x_{min}/K)/N)$$

and with expected value of $H_Z$ at most $$E_0 + O(1)\frac{J_{tot}K^2D^2}{X_{min}^2} + B\left(\frac{x_0 + x_{min}/K}{N}\right)^K \cdot O(1),$$

where the function $\tau(\cdot)$ is defined in lemma 11. If $x_x \ll N$, then $$2^{N\tau^{-1}(x_0/N)} = 2^{\Omega((x^0/N)^2 \log(N/x^0))N}$$

Proof. This follows from lemmas 9, 10, 11. We have dropped the additive $+\frac{1}{2}$ from lemma 9 as it is smaller than other terms hidden in the big-O notation.

VIII. Proof of Theorems 1, 2

A proof is now given for the main theorem. Either $E_{0.1}{}^Q \geq E_0 + \frac{1}{2}$, in which case theorem 3 applies or $E_{0.1}{}^Q \leq E_0 + \frac{1}{2}$ in which case theorem 4 applies. As noted, for $B = -bE_0$, for $k \geq 3$ and $K > \beta$, the condition $B(2K/N)^K \leq \frac{1}{2}$ in theorem 3 holds for all sufficiently large N. In giving the result of item 1, of theorems 1, 2 one can make the simplification $B/(1-E_0) = b \cdot (1 - \mathcal{O}(1/|E_0|))$.

Theorem 4 shows the existence of a probability distribution with large entropy and small expectation value for $H_Z$. To turn this into a statement about N(E) as in theorems 1, 2 one can use the following lemma. Remark: the factor of $\mathcal{O}(\log(N))$ in the statement of the lemma can be interpreted, for physicists, as an entropy difference arising when passing from a canonical to a microcanonical ensemble, and the need for two energies $E_1$, $E_2$ can be interpreted as a Maxwell construction.

Lemma 12. Let p(u) be a probability distribution over basis states $|u\rangle$ such that $$\sum_u p(u)E_u = \overline{E}. \quad (57)$$

Then, there are two energies, $E_1$, $E_2$ with $E_1 \leq \overline{E} \leq E_2$ such that for some probability $P \in [0, 1]$ one has $PE_1 + (1-P)E_2 = \overline{E}$ and $P \log(N(E_1)) + (1-P)\log(N)(E_2)) = S - \mathcal{O}(\log(N))$, where N(E) is the number of computational basis states with expectation value E for $H_Z$.

Then, for some $E \leq \overline{E}$, there are at least $$2^{\frac{S - \mathcal{O}(\log(N))}{2} \frac{E - E_0}{\overline{E} - E_0}}$$

basis states in the computational basis which are eigenstates of $H_Z$ with eigenvalue at most E.

Proof. Let $$P(E) = \sum_{u: E_u = E} p(u). \quad (58)$$

If $P(E) \geq 0$, then for u such that $E_u = E$, let $p(u|E) = p(u)/P(E)$ and let $$S(E) = -\sum_{u: E_u = E} p(u|E) \ln(p(u|E)). \quad (59)$$

Then, $$S = -\sum_E P(E)\ln(P(E)) + \sum_E P(E)S(E). \quad (60)$$

Since there are only $O(N^2)$ possible values of E for which $P(E) \neq 0$, one has $-\rho_E P(E)\ln(P(E)) = \mathcal{O}(\log(N))$. Hence, $\Sigma_E P(E)S(E) \geq S - \mathcal{O}(\log(N))$. Also, $\Sigma_E P(E)E = \bar{E}$. We have $S(E) \leq \log(N(E))$. Hence, $\rho_E P(E)\log(N(E)) \geq S - \mathcal{O}(\log(N))$.

Now maximize $\rho_E P(E)\log(N(E))$ subject to the linear constraints $\Sigma_E P(E)E = \bar{E}$ and $\Sigma_E P(E) = 1$, with $0 \leq P(E) \geq 1$ for all E. Introducing Lagrange multipliers $\lambda_1, \lambda_2$ corresponding to these constraints, one fins that for all E, one has either $P(E)=0$ or $P(E)=1$ (and hence only one choice of E has $P(E) \geq 0$) or $\log(N(E))=\lambda_1 E + \lambda_2$. Let t be the set of E such that $\log(N(E))=\lambda_1 E + \lambda_2$. Since this constraint is linear, for any choice of $P(E)$ such that $P(E)=0$ for $E \notin T$ and $\rho_E P(E)=1$ and $\Sigma_P(E)E=\bar{E}$ one has the same $\Sigma_E P(E)\log(N(E))$. Hence, to maximize $\Sigma_E P(E)\log(N(E))$ it suffices to consider the case that $P(E)$ is nonvanishing for at most 2 choices of E. Let these choice be $E_1, E_2$ with $E_1 < E_2$ and $E_1 \leq \bar{E} \leq E_2$.

Suppose first that $\log(N(E_1)) \geq S/2$. So, $N(E_1)) \geq 2^{S/2}$.

Suppose instead that $\log(N(E_1)) < S/2$. Since $\rho_E P(E) = \bar{E}$, one has $P(E_2)E_2 - E_0) \leq \bar{E} - E_0$. From $\rho_E \log(N(E))P(E) \geq S - \mathcal{O}(\log(N))$, one has $(\bar{E} - E_0)\log(N(E_2))/(E_2 - E_0) \geq S/2 - \mathcal{O}(\log(N))$.

Remark: In the lemma above, the fact that $H_Z$ has integer eigenvalues to bound the entropy $-\Sigma_3 P(E)\ln(P(E))$ was used. For more general $H_Z$, where $J_{ij}$ are chosen more generally, one could bin energies into polynomially many DUH and obtain a similar result.

Using this lemma, now consider the first case of theorem 4, where $K=C \ln(N)$. Theorem 4 shows the existence of a probability distribution $p(u)$ on computational basis states with entropy at least $S=S^{(comp)} \geq N \cdot (1 - \mathcal{O}(1)/C)$ and with expected value of $H_Z$ at most $$\bar{E} = (1-b)E_0 + 1/2 + \mathcal{O}(1) \cdot \frac{J_{tot}}{N^2} C^2 D^2 \ln(N)^2.$$

By lemma 12, there are two energies. $E_1, E_2$ with $E_1 \leq \bar{E} \leq E_2$ such that for some probability $P \in [0,1]$ one has $PE_1 + (1-P)E_2 = \bar{E}$ and $P \log(N(E_1)) + (1-P)\log(N(E_2)) = S - \mathcal{O}(\log(N))$. If $\log(N(E_1)) \geq S - \mathcal{O}(\log(N))$, the conclusion follows. Otherwise, one must have $\log(N(E_2)) \geq S - \mathcal{O}(\log(N))$. If $E_2 - E_0 \geq (1+\eta)(\bar{E}-E_0)$, the $P_2 \leq 1/(1+\eta)$ since $E_1 - E_0 \geq 0$. Since $\log(N(E_2)) \leq N$, one has $P_1 \log(N(E_1)) + P_2 N \geq S$ so $$\log(N(E_1)) \geq N \cdot \left(1 - \mathcal{O}(1)\frac{1+\eta}{\eta}\frac{1}{C}\right).$$

This completes the proof of theorem 1.

Now consider the second case of theorem 4, where K is a constant. The theorem shows that for some $x_0 \geq (1-1/K)N \cdot (\frac{1}{2}N^2)^{1/K}$, there is some probability distribution $p(u)$ on computational basis states with entropy at least $S=S^{(comp)} \geq N\tau^{-1}((x_0 - x_{min}/K)/N)$ and with expected value of $H_Z$ at most $$\bar{E} = E_0 + \mathcal{O}(1)\frac{J_{tot}K^2D^2}{X_{min}^2} + B\left(\frac{x_0 + x_{min}/K}{N}\right)^K \cdot \mathcal{O}(1).$$

Shifting $x_0$ by $x_{min}/K$, one can find that for some $x_0 \geq (1-1/K)N \cdot (\frac{1}{2}N^2)^{1/K}$, there is some probability distribution $p(u)$ on computational basis states with entropy at least $S=S^{(comp)} \geq N\tau^{-1}(x_0/N)$ and with expected value of $H_Z$ at most $$\bar{E} = E_0 + \mathcal{O}(1)\frac{J_{tot}K^2D^2}{X_{min}^2} + B\left(\frac{x_0 + 2x_{min}/K}{N}\right)^K \cdot \mathcal{O}(1).$$

However, for the given range of $x_0$, one has $$\left(\frac{x_0 + 2x_{min}/K}{N}\right)^K \leq (x_0/N)^K \mathcal{O}(1),$$

so $$\bar{E} = E_0 + \mathcal{O}(1)\frac{J_{tot}K^2D^2}{X_{min}^2} + B(x_0/N)^K \cdot \mathcal{O}(1).$$

Now removing the restriction on the range of $x_0$ allowing $0 \leq x_0 \leq N$ and defining $m_x = x_0 N$, one finds that for some $m_x \in [0,1]$ there is a probability distribution with entropy $S \geq N\tau^{-1}(m_x)$ and with expected value of $H_Z$ at most $$E_0 + \mathcal{O}(1)\frac{J_{tot}K^2D^2}{X_{min}^2} + B(m_x)^K \cdot \mathcal{O}(1) \leq \quad (61)$$

$$E_0 + \mathcal{O}(1)\frac{J_{tot}K^2D^2}{X_{min}^2} + B(r(S/N))^K \cdot \mathcal{O}(1) \equiv F(S).$$

By lemma 12, there are two energies, $E_1, E_2$ with $E_1 \leq \bar{E} \leq E_2$ such that for some probability $P \in [0, 1]$ one has $PE_1 + (1-P)E_2 = \bar{E}$ and $P \log(N(E_1)) + (1-P)\log(N(E_2)) = S - \mathcal{O}(\log(N))$. The function $F(S)$ is a convex function, so either $E_1 \leq E(\log(N_1))$ or $E_2 \leq E(\log(N_2))$. This completes the proof of theorem 2.

IX. Discussion

In this disclosure, example embodiments of a quantum a procedure for, for example, exact optimization were given. Embodiments of the example procedure lead to a nontrivial speedup, assuming a bound on the number of computational basis states with low energy for $H_Z$. This naturally leads to a hybrid algorithm: if the bound is obeyed, one can run an embodiment of the procedure disclose here; while, if the bound is not obeyed, one can find a low energy state (e.g., an approximate solution of the optimization problem) by repeated random sampling or by Grover search.

X. Reduction to Unique Ground State

In this section, corollaries are presented as to how to reduce the problem without the degeneracy assumption to the problem with the degeneracy assumption, at an additional time cost.

For given $H_Z$, consider a more general family of Hamiltonians, of the form $H_Z + \Sigma_i h_i Z_i$, where the $h_i$ are chosen from $\{-1, 0, +1\}$. Here, one can define a sequence of such Hamiltonians, $H^{(0)}, H^{(1)}, \ldots, H^{(m)}$, with $H^{(0)} = H_Z$ so that for $H^{(0)}$ are $h_i = 0$ and each $H^{(a+1)}$ is constructed from $H^{(a)}$ by picking some i such that $h_i = 0$ in the Hamiltonian $H^{(a)}$ and setting $h_i$ either equal to +1 or −1 in $H^{(a+1)}$, while leaving all other terms in the Hamiltonian unchanged.

Before continuing, the following lemma is introduced:

Lemma 13. Consider any arbitrary set S with $S \subset \{-1, +1\}^N$ and $|S|>1$. Write elements of S as vectors $v=(v_1, \ldots, v_N)$ with $v_i \in \{-1, +1\}$. Then, there exists some $i \in \{1, \ldots, N\}$ and some $\sigma \in \{-1, +1\}$ such that for $$T = S \cap \{v | v_i = \sigma\}$$

one has $1 \leq |T| \leq S/2$. In words, the set T is the set of vectors in S such that the i-th entry of the vector is equal to it.

Proof. For each i, let $n_i = |S \cap \{v | v_i = +1\}|$. If for some i, one has $0 < n_i < |S|$, then either $1 \leq n_i \leq |S|/2$ in which case one can pick $T = S \cap \{v | v_i = +1\}$ or $S/2 \leq n_i \leq |S|-1$ in which case one can pick $T = S \cap \{v | v_i = -1\}$. On the other hand, if for all i one has $n_i \in \{0, |S|\}$, then $|S| \leq 1$ which contradicts the assumptions of the lemma (proof: without loss of generality assume that $n_i = |S|$ for all i; then, only the all +1 vector can be in S).

Let $H^{(a)}$ have $n_{gs}(a)$ different ground states. Write $n_{gs} = n_{gs}(0)$. The following lemma will now be shown.

Lemma 14. For some, $m \leq \log_2(n_{gs})$, one can chose $H^{(a)}$ such that $1 \leq n_{gs}(i+1) \leq n_{gs}(i)/2$ for all i with $n_{gs}(m) = 1$.

Proof. The proof is inductive. Let $S^{(a)}$ be the set of ground states of $H^{(a)}$. One can construct each $H^{(a)}$ such if it has $h_i \neq 0$ for any i, then all ground states of $H^{(a)}$ have $v_i = -h_i$. Then, apply lemma !! with $S = S^{(a)}$. Find the i, $\sigma$ so that for $T = S \cap \{v | v_i = \sigma\}$ one has $1 \leq |T| \leq S/2$. Then set $H^{(a+1)} = H^{(a)} - \sigma Z_i$. Since the added term $-\sigma Z_i$ is equal to it minimal possible value of −1 on some non-empty subset of the ground states of $H^{(a)}$, those states are the ground states of $H^{(a+1)}$ and the inductive assumption holds.

Hence, if $H_Z$ has $n_{gs}$ ground state, then one find some Hamiltonian $H_Z + \Sigma_i h_i Z_i$ with the following properties. First, it has a unique ground state which is also a ground state of $H_Z$. Second, the number of nonzero $h_i$ is at most $\log_2(n_{gs})$. That is, writing $\vec{h}$ as a vector with entries $h_i$, the vector $\vec{h}$ has $\log_2(n_{gs})$ nonzero entries.

There are $$2^1 \binom{N}{1} + 2^2 \binom{N}{2} + \ldots + 2^{n_{gs}} \binom{N}{\log_2(n_{gs})} \leq (2N)^{\log_2(n_{gs})}$$

possible choices of $\vec{h}$.

The Hamiltonians of the form $H_Z + \Sigma_i h_i Z_i$ do not have all terms of the same degree, as some terms have degree D and some have degree 1. However, for any such Hamiltonian $H_Z + \Sigma_i h_i Z_i$ with a unique ground state, one can define a Hamiltonian H' on N+D+1 qubits which obeys the degeneracy assumption (e.g., has a unique ground state for odd D or a doubly degenerate state for even D) so that the ground state of $H_Z + \Sigma_i h_i Z_i$ can be trivially obtained from a ground state of H'. To do this, add D+1 qubits, labelled N+1, ..., N+D+2. Write J equal to the sum of all possible D-th order monomials in Pauli Z operators on those added qubits, with a coefficient −1 in front of each monomial. For example, for D=3, one has $J = -Z_{N+1}Z_{N+2}Z_{N+3} - Z_{N+1}Z_{N+2}Z_{N+4} - Z_{N+1}Z_{N+3}Z_{N+4} - Z_{N+2}Z_{N+3}Z_{N+4}$. Let Consider the Hamiltonian $$H_Z + J + \sum_{i \leq N} h_i Z_i Z_{N+1} Z_{N+2} \ldots Z_{N+D-1}.$$

The term J is minimized, for even D, by all Z, being the same for i>N while for odd D is it minimized by all $Z_i$ equaling +1 for i>N. The terms $H_Z + \Sigma_{1 \leq N} h_i Z_i Z_{N+1} Z_{N+2} \ldots Z_{N+D-1}$ can be minimized by choosing all $Z_i = +1$ and choosing the unique ground state of $H_Z + \Sigma_i h_i Z_i$ found above. Thus $H_Z + J + \Sigma_{i \leq N} h_i Z_i Z_{N+1} Z_{N+2} \ldots Z_{N+D-1}$ obeys the degeneracy assumption and finding its ground state directly gives a ground state of $H_Z$.

Thus, one can reduce to the unique ground state problem at the cost of trying $(2N)^{\log_2(n_{gs})}$ different choices of $\vec{h}$. This number is small if $n_{gs}$ is small, while if $n_{gs}$ is large, one can find the ground state more rapidly by Grover search. Considering the algorithm with logarithmically growing K, note that if $n_{gs} \geq 2^{rN/\log_2(N)^2}$ for some scaler r then one can find the ground state using Grover search in expected time $\mathcal{O}^*(2^{N/2 - rN/\log_2(N)^2/2})$, while if $n_{gs} \leq 2^{rN/\log_2(N)^2}$ then there are only $(2N)^{rN/\log_2(N)^2} = 2^{rN/\log(N) + \mathcal{O}^*(N/\log_2(N)^2)}$ choices of $\vec{h}$. For $R < b/(2CD)$, theorem 1 shows a speedup greater than $2^{rN/\log(N)}$ and so one still has a $2^{const. \times N/\log(N)}$ speedup in this case.

XI. Example Computing Environments

Figure 2:
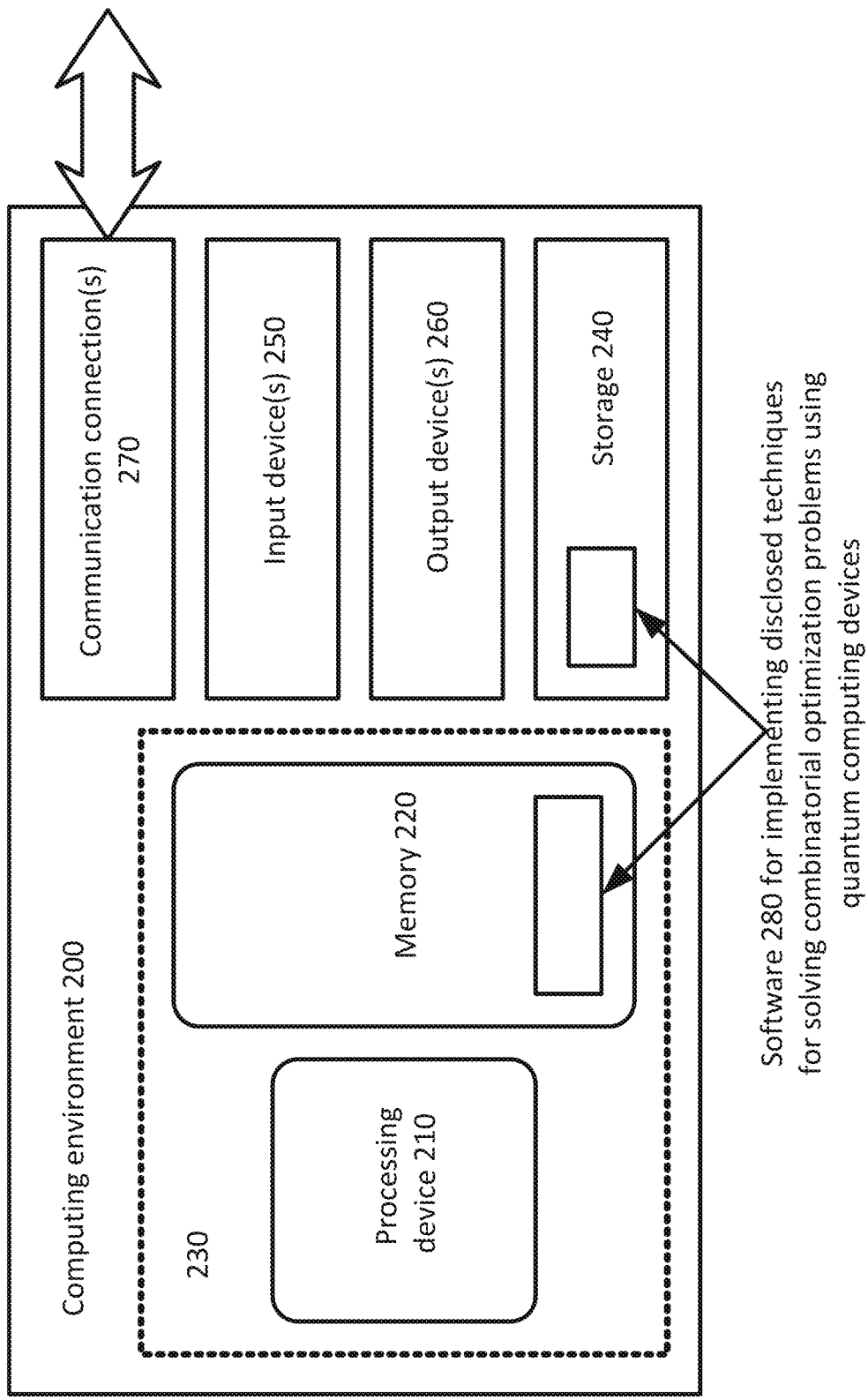
FIG. 2 illustrates a generalized example of a suitable classical computing environment in which aspects of the described embodiments can be implemented.

FIG. 2 illustrates a generalized example of a suitable classical computing environment 200 in which aspects of the described embodiments can be implemented. The computing environment 200 is not intended to suggest any limitation as to the scope of use or functionality of the disclosed technology, as the techniques and tools described herein can be implemented in diverse general-purpose or special-purpose environments that have computing hardware.

With reference to FIG. 2, the computing environment 200 includes at least one processing device 210 and memory 220. In FIG. 2, this most basic configuration 230 is included within a dashed line. The processing device 210 (e.g., a CPU or microprocessor) executes computer-executable instructions. In a multi-processing system, multiple processing devices execute computer-executable instructions to increase processing power. The memory 220 may be volatile memory (e.g., registers, cache, RAM, DRAM, SRAM), non-volatile memory (e.g., ROM, EEPROM, flash memory), or some combination of the two. The memory 220 stores software 280 implementing tools for performing any of the disclosed techniques for operating a quantum computer to solve combinatorial optimization problems in the quantum computer as described herein. The memory 220 can also store software 280 for synthesizing, generating, or compiling quantum circuits (or performing the described techniques for solving combinatorial optimization problems using quantum computing devices as described herein).

The computing environment can have additional features. For example, the computing environment 200 includes storage 240, one or more input devices 250, one or more output devices 260, and one or more communication connections 270. An interconnection mechanism (not shown), such as a bus, controller, or network, interconnects the components of the computing environment 200. Typically, operating system software (not shown) provides an operating environment for other software executing in the computing environment 200, and coordinates activities of the components of the computing environment 200.

The storage 240 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 200. The storage 240 can also store instructions for the software 280 implementing any of the disclosed techniques for solving combinatorial optimization problems in a quantum computing device. The storage 240 can also store instructions for the software 280 for generating and/or synthesizing any of the described techniques, systems, or quantum circuits.

The input device(s) 250 can be a touch input device such as a keyboard, touchscreen, mouse, pen, trackball, a voice input device, a scanning device, or another device that provides input to the computing environment 200. The output device(s) 260 can be a display device (e.g., a computer monitor, laptop display, smartphone display, tablet display, netbook display, or touchscreen), printer, speaker, or another device that provides output from the computing environment 201).

The communication connection(s) 270 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods, techniques for controlling a quantum computing device to solve combinatorial optimization problems, circuit design techniques, or compilation/synthesis techniques can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 220 and/or storage 210, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 3:
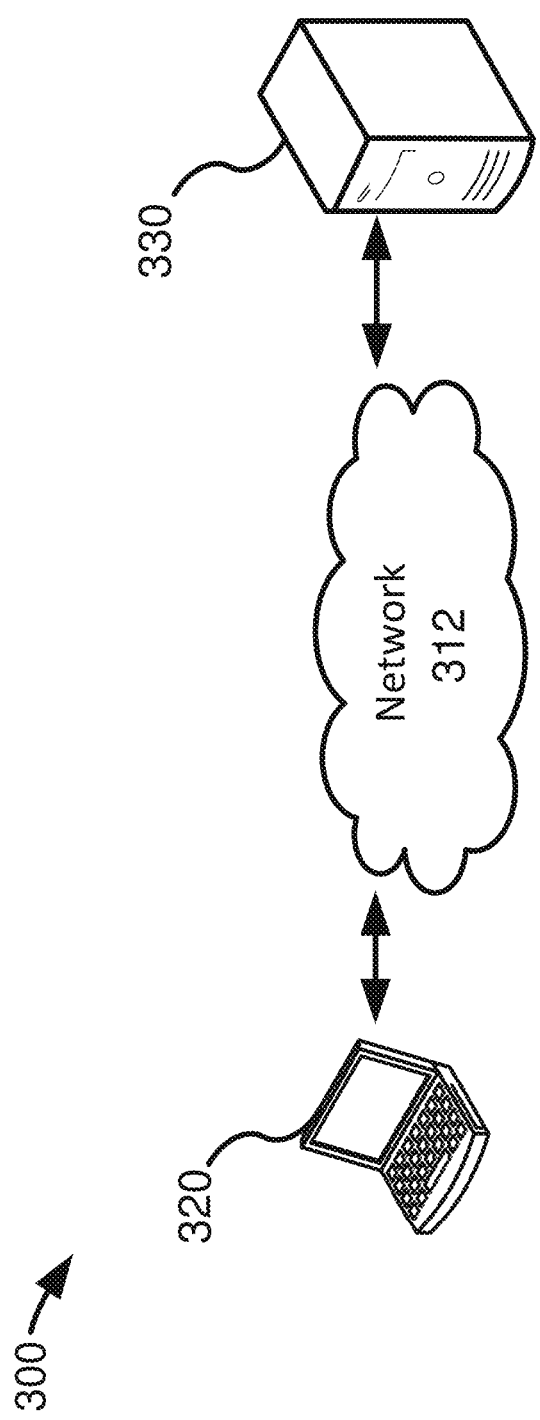
FIG. 3 shows an example of a possible network topology (e.g., a client-server network) for implementing a system according to the disclosed technology.

An example of a possible network topology 300 (e.g., a client-server network) for implementing a system according to the disclosed technology is depicted in FIG. 3. Networked computing device 320 can be, for example, a computer running a browser or other software connected to a network 312. The computing device 320 can have a computer architecture as shown in FIG. 2 and discussed above. The computing device 320 is not limited to a traditional personal computer but can comprise other computing hardware configured to connect to and communicate with a network 312 (e.g., smart phones, laptop computers, tablet computers, or other mobile computing devices, servers, network devices, dedicated devices, and the like). Further, the computing device 320 can comprise an FPGA or other programmable logic device. In the illustrated embodiment, the computing device 320 is configured to communicate with a computing device 330 (e.g., a remote server, such as a server in a cloud computing environment) via a network 312. In the illustrated embodiment, the computing device 320 is configured to transmit input data to the computing device 330, and the computing device 330 is configured to implement a technique for controlling a quantum computing device to solve combinatorial optimization problems according to any of the disclosed embodiments and/or a circuit generation/compilation/synthesis technique for generating quantum circuits for performing any of the techniques for solving combinatorial optimization problems disclosed herein. The computing device 330 can output results to the computing device 920. Any of the data received from the computing device 330 can be stored or displayed on the computing device 320 (e.g., displayed as data on a graphical user interface or web page at the computing devices 320). In the illustrated embodiment, the illustrated network 912 can be implemented as a Local Area Network (LAN) using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 312 can be the Internet or a similar public network and operate using an appropriate protocol (e.g., the HTTP protocol).

Figure 4:
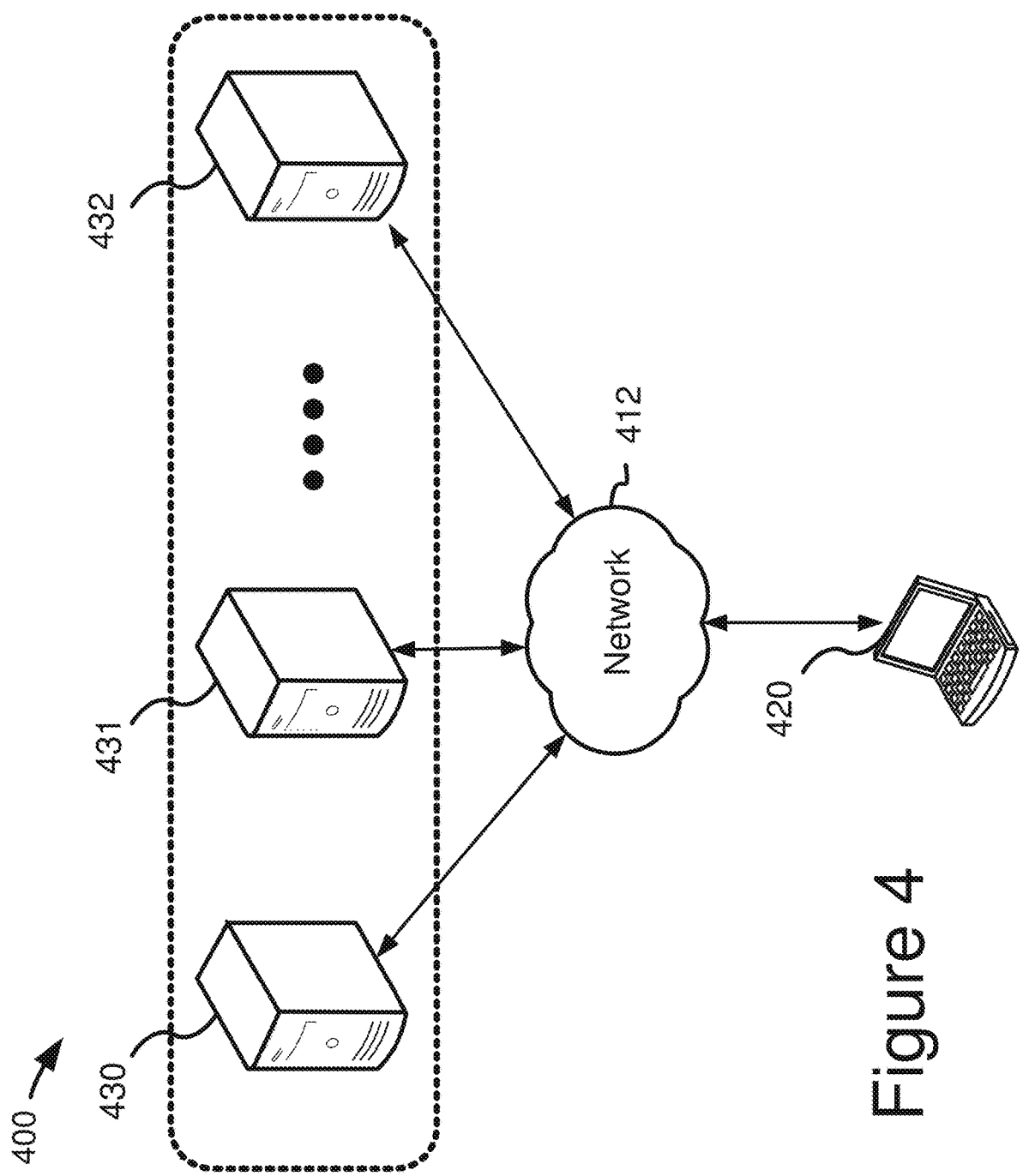
FIG. 4 shows another example of a possible network topology (e.g., a distributed computing environment) for implementing a system according to the described technology.

Another example of a possible network topology 400 (e.g., a distributed computing environment) for implementing a system according to the disclosed technology is depicted in FIG. 4. Networked computing device 120 can be, for example, a computer running a browser or other software connected to a network 412. The computing device 420 can have a computer architecture as shown in FIG. 4 and discussed above. In the illustrated embodiment, the computing device 420 is configured to communicate with multiple computing devices 430, 431, 432 (e.g., remote servers or other distributed computing devices, such as one or more servers in a cloud computing environment) via the network 412. In the illustrated embodiment, each of the computing devices 430, 431, 432 in the computing environment 400 is used to perform at least a portion of a technique for controlling a quantum computing device to solve combinatorial optimization problems according to any of the disclosed embodiments and/or a circuit generation/compilation/synthesis technique for generating quantum circuits for performing any of the techniques for solving combinatorial optimization problems disclosed herein. In other words, the computing devices 430, 431, 432 form a distributed computing environment in which aspects of the techniques for solving combinatorial optimization problems in a quantum computing device as disclosed herein and/or quantum circuit generation/compilation/synthesis processes are shared across multiple computing devices. The computing device 420 is configured to transmit input data to the computing devices 430, 431, 432, which are configured to distributively implement such as process, including performance of any of the disclosed methods or creation of any of the disclosed circuits, and to provide results to the computing device 420. Any of the data received from the computing devices 430, 431, 432 can be stored or displayed on the computing device 420 (e.g., displayed as data on a graphical user interface or web page at the computing devices 420). The illustrated network 412 can be any of the networks discussed above with respect to FIG. 3.

Figure 5:
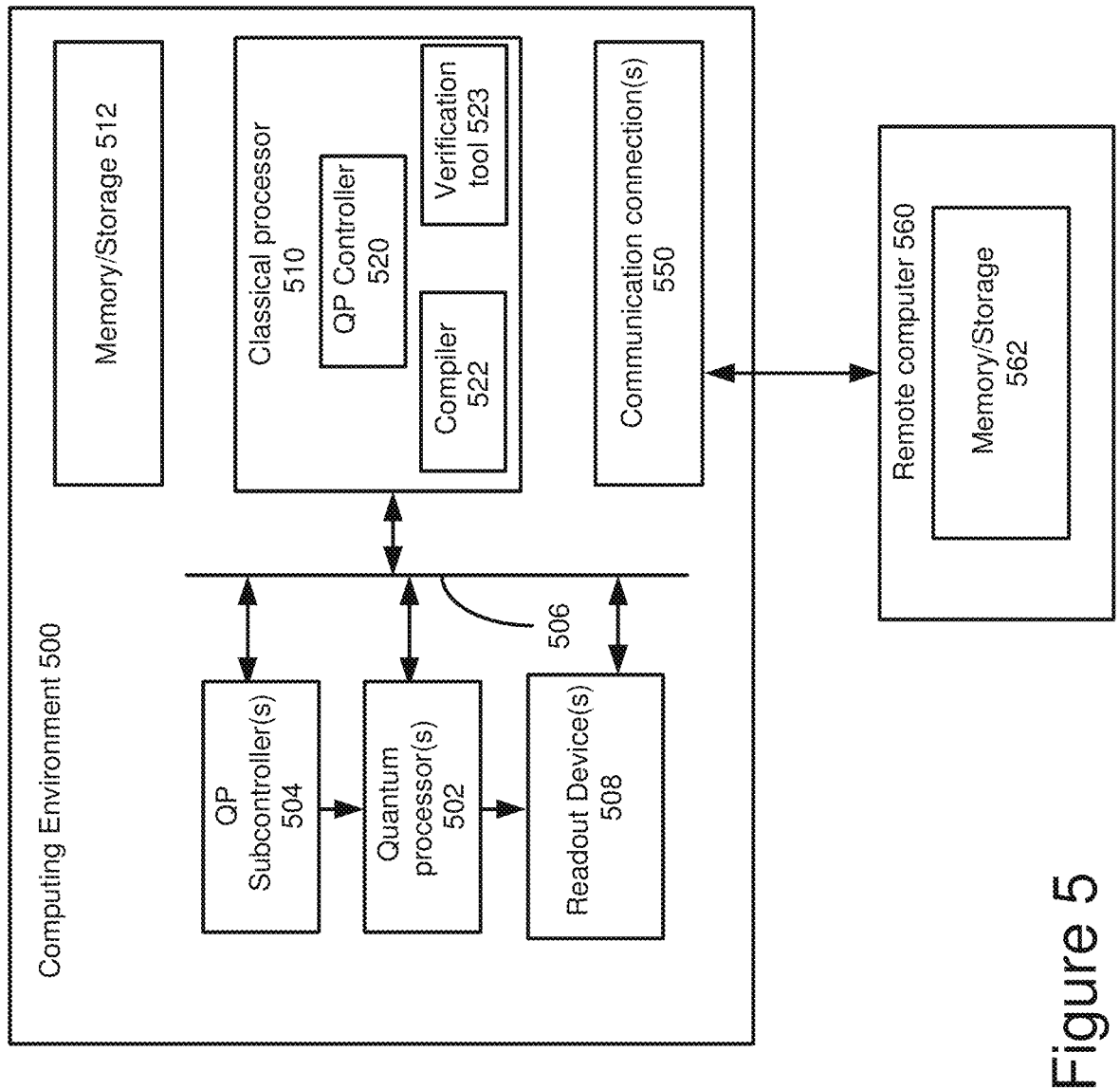
FIG. 5 shows an exemplary system for implementing the disclosed technology.

With reference to FIG. 5, an exemplary system for implementing the disclosed technology includes computing environment 500. In computing environment 500, a compiled quantum computer circuit description (including quantum circuits configured to perform any of the disclosed techniques for solving combinatorial optimization problems as disclosed herein) can be used to program (or configure) one or more quantum processing units such that the quantum processing unit(s) implement the circuit described by the quantum computer circuit description.

The environment 500 includes one or more quantum processing units 602 and one or more readout device(s) 508. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits, including any of the disclosed circuits, can be sent into (or otherwise applied the quantum processing unit(s) via control lines 506 at the control of quantum processor controller 520. The quantum processor controller (QP controller) 520 can operate in conjunction with a classical processor 510 (e.g., having an architecture as described above with respect to FIG. 2) to implement the desired quantum computing process. In the illustrated example, the QP controller 520 further implements the desired quantum computing process via one or more QP subcontrollers 504 that are specially adapted to control a corresponding one of the quantum processor(s) 502. For instance, in one example, the quantum controller 520 facilitates implementation of the compiled quantum circuit by sending instructions to one or more memories (e.g., lower-temperature memories), which then pass the instructions to low-temperature control unit(s) (e.g., QP subcontroller(s) 504) that transmit, for instance, pulse sequences representing the gates to the quantum processing unit(s) 502 for implementation. In other examples, the QP controller(s) 520 and QP subcontroller(s) 504 operate to provide appropriate magnetic fields, encoded operations, or other such control signals to the quantum processor(s) to implement the operations of the compiled quantum computer circuit description. The quantum controller(s) can further interact with readout devices 508 to help control and implement the desired quantum computing process (e.g., by reading or measuring out data results from the quantum processing units once available, etc.)

With reference to FIG. 5, compilation is the process of translating a high-level description of a quantum algorithm into a quantum computer circuit description comprising a sequence of quantum operations or gates, which can include the circuits as disclosed herein (e.g., the circuits configured to perform one or more procedures for solving combinatorial optimization problems as disclosed herein). The compilation can be performed by a compiler 522 using a classical processor 510 (e.g., as shown in FIG. 2) of the environment 500 which loads the high-level description from memory or storage devices 512 and stores the resulting quantum computer circuit description in the memory or storage devices 512.

In other embodiments, compilation and/or verification can be performed remotely by a remote computer 500 (e.g., a computer having a computing environment as described above with respect to FIG. 2) which stores the resulting quantum computer circuit description in one or more memory or storage devices 562 and transmits the quantum computer circuit description to the computing environment 500 for implementation in the quantum processing unit(s) 502. Still further, the remote computer 500 can store the high-level description in the memory or storage devices 562 and transmit the high-level description to the computing environment 600 for compilation and use with the quantum processor(s). In any of these scenarios, results from the computation performed by the quantum processor(s) can be communicated to the remote computer after and/or during the computation process. Still further, the remote computer can communicate with the QP controller(s) 520 such that the quantum computing process (including any compilation, verification, and QP control procedures) can be remotely controlled by the remote computer 560. In general, the remote computer 560 communicates with the QP controller(s) 520, compiler/synthesizer 522, and/or verification tool 523 via communication connections 550.

In particular embodiments, the environment 500 can be a cloud computing environment, which provides the quantum processing resources of the environment 500 to one or more remote computers (such as remote computer 560) over a suitable network (which can include the internet).

XII. Further Embodiments for Solving Combinatorial Optimization Problems

In this section, example methods for solving combinatorial optimization problems in a quantum computing device using embodiments of the disclosed technology are disclosed. The particular embodiments described should not be construed as limiting, as the disclosed method acts can be performed alone, in different orders, or at least partially simultaneously with one another. Further, any of the disclosed methods or method acts can be performed with any other methods or method acts disclosed herein.

Figure 6:
FIG. 6 is a flow chart showing a general method for performing embodiments of the disclosed technology.

FIG. 6 is a flow chart 600 showing an example method of operating a quantum computing device in accordance with an embodiment of the disclosed technology.

At 610, a quantum computing device is caused to evolve from a first Hamiltonian state toward a second Hamiltonian state, wherein the second Hamiltonian state provides a solution to a combinatorial optimization problem, and wherein the first Hamiltonian state is not the ground state of the first Hamiltonian.

In certain implementations, the causing the quantum computing device to evolve from the first Hamiltonian state to the second Hamiltonian state comprises applying a measurement procedure that adiabatically evolves qubits of the quantum compiling device toward the second Hamiltonian state. The measurement procedure can comprise, for example, the measurement procedure of Algorithm 2. In particular implementations, the solution is an exact solution to the combinatorial optimization problem.

In some implementations, the solution is an approximate solution to the combinatorial optimization problem, and the method further comprises performing a random sampling or Grover search during the evolution, thereby determining that a currant state of the quantum computing device is the approximate solution and outputting the approximate solution.

In certain implementations, the quantum computing device applies amplitude amplification to the evolution to increase the success probability of the evolution.

Another embodiment is a quantum computing device configured to evolve from a non-ground-state first Hamiltonian state to a second Hamiltonian state that describes a solution to a combinatorial optimization problem.

Figure 7:
FIG. 7 is a flow chart showing a further general method for performing embodiments of the disclosed technology.

FIG. 7 is a flow chart 700 showing an example method of operating a quantum computing device in accordance with an embodiment of the disclosed technology.

At 710, a quantum computing device is caused to evolve from a first Hamiltonian state toward a second Hamiltonian state, wherein a term proportional to $H_Z$ is fixed during the evolution and a term that is proportional to a power of a transverse field is varied during the evolution.

In some implementations, the second Hamiltonian state describes an exact solution to a combinatorial optimization problem. In certain implementations, the second Hamiltonian state describes an approximate solution to the combinatorial optimization problem, and the method further comprises: performing a random sampling or Grover search during the evolution, thereby determining that a current state of the quantum computing device is the approximate solution; and outputting the approximate solution. In further implementations, the quantum computing device applies amplitude amplification to the evolution to increase the success probability of the evolution.

Another embodiment is a quantum computing device configured to evolve from a first Hamiltonian state toward a second Hamiltonian state, wherein a term proportional to $H_Z$ is fixed during the evolution and a term that is proportional to a power of a transverse field is varied during the evolution.

Figure 8:
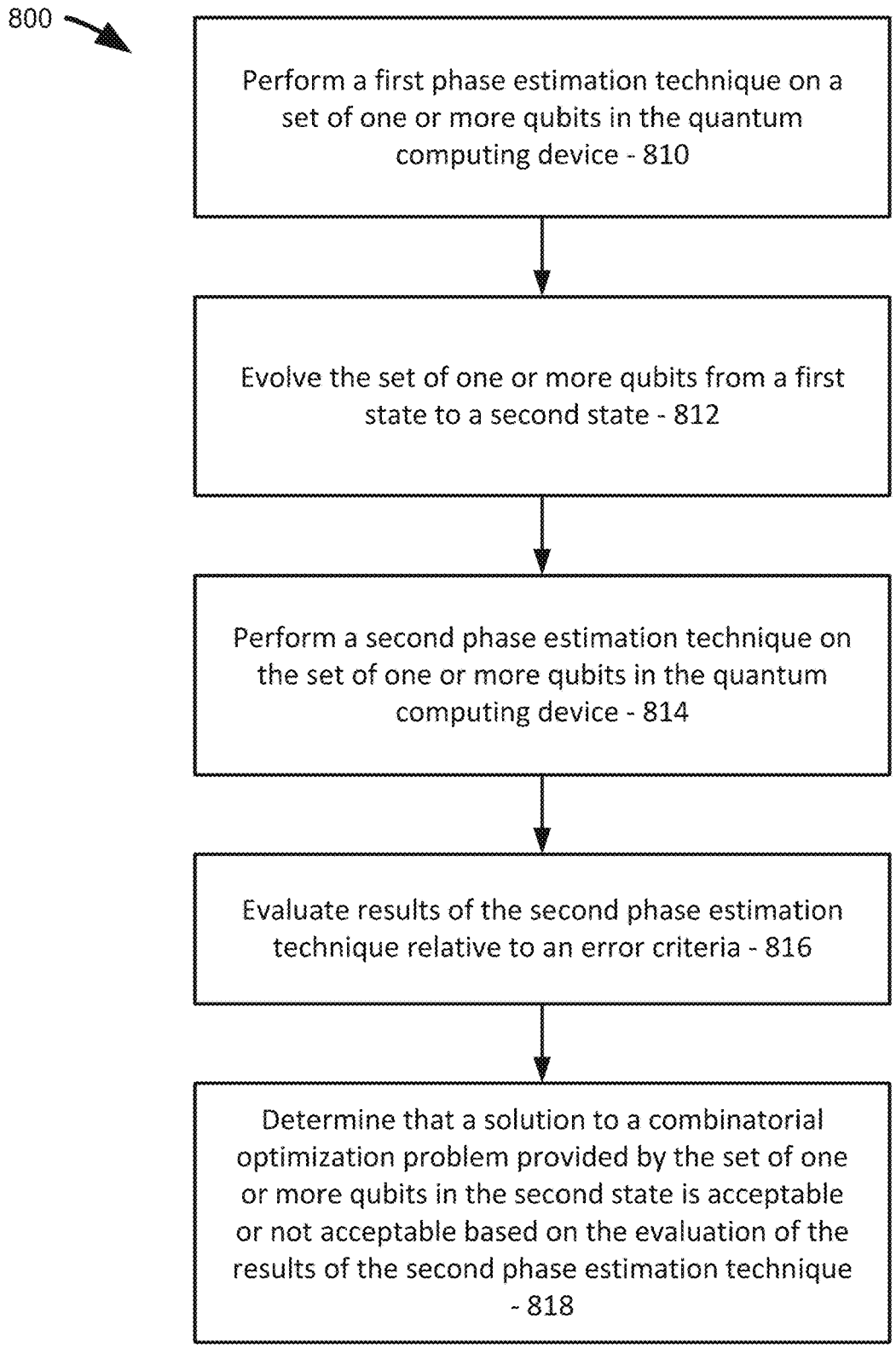
FIG. 8 is a flow chart showing a further general method for performing embodiments of the disclosed technology.

FIG. 8 is a flow chart 800 showing an example method of operating a quantum computing device in accordance with an embodiment of the disclosed technology.

At 810, a first phase estimation technique is performed on a set of one or more qubits in the quantum computing device.

At 812, after the first phase estimation, the set of one or more qubits is evolved from a first state to a second state.

At 814, after the evolving, a second phase estimation technique is performed on the set of one or more qubits in the quantum computing device.

At 816, results of the second phase estimation technique are evaluated relative to an error criteria.

At 818, a solution to a combinatorial optimization problem provided by the set of one or more qubits in the second state is determined to be acceptable or not acceptable based on the evaluation of the results of the second phase estimation technique.

In some implementations, the method further comprises, prior to the evolving, evaluating results of the first phase estimation technique relative to the error criteria; and resetting the one or more qubits if the one or more qubits do not satisfy the error criteria.

In certain implementations, the first state is a first Hamiltonian state that is not a ground state. In some implementations, the second state is an exact solution to the combinatorial optimization problem.

In further implementations, the second state is an approximate solution to the combinatorial optimization problem.

Figure 9:
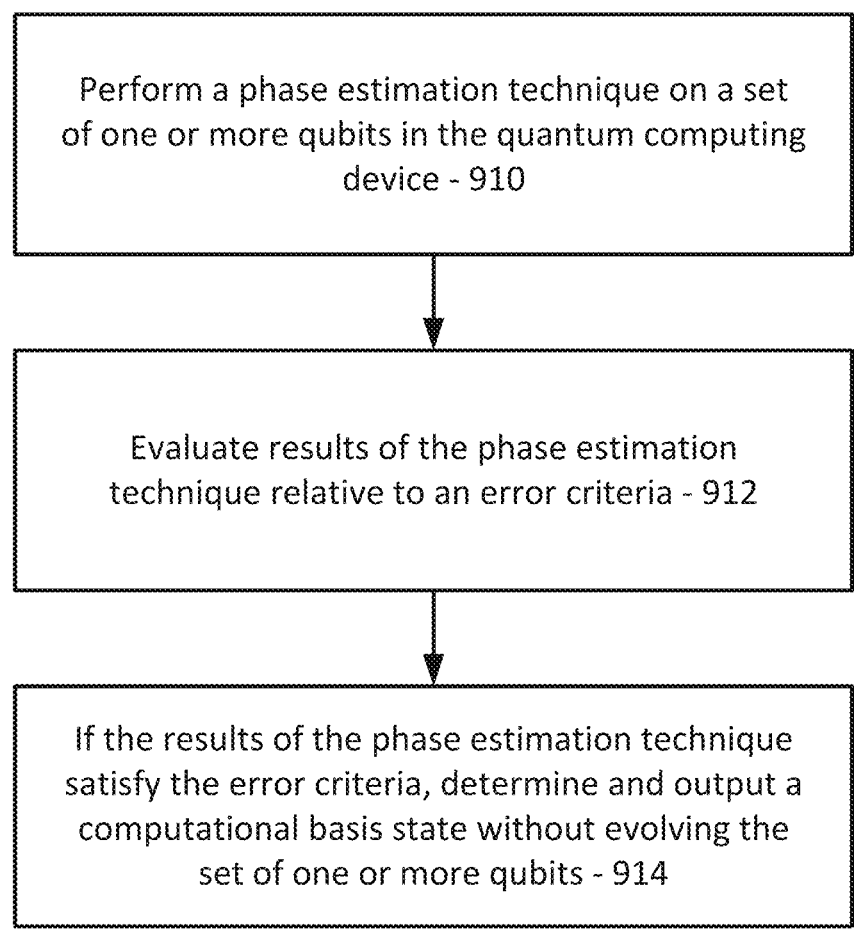
FIG. 9 is a flow chart showing a further general method for performing embodiments of the disclosed technology.

FIG. 9 is a flow chart 900 showing an example method of operating a quantum computing device in accordance with an embodiment of the disclosed technology.

At 910, a phase estimation technique is performed on a set of one or more qubits in the quantum computing device.

At 912, results of the phase estimation technique are evaluated relative to an error criteria.

At 914, if the results of the phase estimation technique satisfy the error criteria, a computational basis state is determined and output without evolving the set of one or more qubits.

In certain implementations, the determining and outputting the computational basis state without evolving the set of one or more qubits comprises measuring a state of the one or more qubits in the computational basis to a generate a computational basis state; and computing a value of $H_Z$. In particular implementations, the computing the value of $H_Z$ is performed using a classical computer.

In some implementations, the determining and outputting the computational basis state without evolving the set of one or more qubits further comprises: comparing the value of $H_Z$ to an expected energy value; and based on the comparison, determining that the computational basis state is an acceptable solution to a combinatorial optimization problem.

Any of the methods described above can be performed at least in part by one or more computer-readable media storing computer-executable instructions, which when executed by a classical computer cause the classical computer to perform the method. Further, the methods can be performed at least in part by a quantum computing system. In such embodiments, the quantum computing system, comprises a quantum computing device comprising a quantum circuit; and a classical computing device in communication with the quantum computing device and adapted to perform any of the methods described above.

XIII. Concluding Remarks

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

The invention claimed is:

1. A method of operating a quantum computing device, comprising:
    performing a first phase estimation technique on a set of one or more qubits in the quantum computing device;
    after the first phase estimation, evolving the set of one or more qubits from a first state to a second state;
    after the evolving, performing a second phase estimation technique on the set of one or more qubits in the quantum computing device;
    evaluating results of the second phase estimation technique relative to an error criteria; and determining that a solution to a combinatorial optimization problem provided by the set of one or more qubits in the second state is acceptable or not acceptable based on the evaluation of the results of the second phase estimation technique.

2. The method of claim 1, further comprising:
    prior to the evolving, evaluating results of the first phase estimation technique relative to the error criteria, and resetting the one or more qubits if the one or more qubits do not satisfy the error criteria.

3. The method of claim 1, wherein the first state is a first Hamiltonian state that is not a ground state.

4. The method of claim 1, wherein the second state is an exact solution to the combinatorial optimization problem.

5. The method of claim 1, wherein the second state is an approximate solution to the combinatorial optimization problem.

\* \* \* \* \*